US007300503B2

(12) United States Patent
Tateishi et al.

(10) Patent No.: US 7,300,503 B2
(45) Date of Patent: *Nov. 27, 2007

(54) DYE MIXTURE AND INK CONTAINING THE SAME, INKJET RECORDING METHOD AND IMAGE FORMING METHOD

(75) Inventors: Keiichi Tateishi, Minami-Ashigara (JP); Yoshiharu Yabuki, Minami-Ashigara (JP); Shigeaki Tanaka, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/184,871

(22) Filed: Jul. 20, 2005

(65) Prior Publication Data

US 2006/0016026 A1 Jan. 26, 2006

(30) Foreign Application Priority Data

Jul. 21, 2004 (JP) ............................ 2004-213073

(51) Int. Cl.
*C09D 11/00* (2006.01)
*C09D 11/02* (2006.01)
*C09B 47/04* (2006.01)

(52) U.S. Cl. .............................. 106/31.49; 106/31.78; 8/638; 8/661

(58) Field of Classification Search ............. 106/31.49, 106/31.78; 8/638, 661
See application file for complete search history.

(56) References Cited

U.S. PATENT DOCUMENTS

| 5,882,390 A * | 3/1999 | Nagai et al. ............. 106/31.49 |
| 7,097,701 B2 * | 8/2006 | Tateishi et al. ......... 106/31.49 |
| 7,132,012 B2 * | 11/2006 | Tateishi et al. ......... 106/31.46 |
| 2003/0164114 A1 * | 9/2003 | Kitayama et al. ........ 106/31.46 |
| 2004/0099181 A1 * | 5/2004 | Tateishi et al. ......... 106/31.47 |
| 2004/0187735 A1 * | 9/2004 | Taguchi et al. .......... 106/31.27 |
| 2005/0165130 A9 * | 7/2005 | Ikeda et al. ................. 523/160 |
| 2005/0215773 A1 * | 9/2005 | Tateishi et al. ............. 534/653 |
| 2005/0231574 A1 * | 10/2005 | Ozawa ....................... 347/100 |

FOREIGN PATENT DOCUMENTS

| JP | 7-138511 | 5/1995 |
| JP | 2000-303009 | 10/2000 |
| JP | 2000-313837 | 11/2000 |
| JP | 2003-34758 | 2/2003 |
| JP | 2004-2670 | 1/2004 |
| WO | 99/13009 | 3/1999 |
| WO | 99/67334 | 12/1999 |
| WO | 00/08102 | 2/2000 |
| WO | 00/08103 | 2/2000 |
| WO | 02/34844 A1 | 5/2002 |

* cited by examiner

*Primary Examiner*—Helene Klemanski
(74) *Attorney, Agent, or Firm*—Buchanan Ingersoll & Rooney PC

(57) ABSTRACT

A phthalocyanine dye mixture having a specific structure, an ink using the dye mixture, an inkjet recording ink, an inkjet recording method and a method for improving preservability of image formed are provided.

8 Claims, No Drawings

DYE MIXTURE AND INK CONTAINING THE SAME, INKJET RECORDING METHOD AND IMAGE FORMING METHOD

BACKGROUND OF THE INVENTION

1. Field of the Invention

The present invention relates to a novel dye mixture, which is improved in solubility and excellent in fastness, and a color composition, particularly, a color composition for image formation, for example, ink, inkjet recording ink or paint, an inkjet recording method and a method for improving ozone gas resistance of a color image material formed.

2. Description of the Related Art

As for image recording materials, materials for forming color images especially predominate in recent years. Specifically, recording materials for inkjet system, recording materials for heat-sensitive transfer system, recording materials for electrophotographic system, silver halide photosensitive materials for transfer system, printing inks, recording pens and the like are actively utilized. Also, color filters are employed in image-sensor; for example, CCD with respect to photographic equipment and in LCD or PDP with respect to display in order to record or reproduce color images.

In the color image recording materials and color filters, dyes or pigments for three primary colors of a so-called additive color mixing process or subtractive color mixing process are used in order to record or reproduce full color images. In the present circumstances, however, a dye that has absorption characteristics capable of achieving preferable color reproduction area and is strong to withstand various use conditions is not available and improvements have been strongly desired.

Inkjet recording methods have been rapidly spread and are still expanding because material cost is inexpensive, high speed recording can be carried out, noise at the recording is low and color recording can be easily conducted.

The inkjet recording methods include a continuous system where a liquid droplet is continuously ejected and an on-demand system where a liquid droplet is ejected corresponding to signal of image information. As for the ejecting system, the inkjet recording methods include a system where a liquid droplet is ejected by applying pressure using a piezoelectric element, a system where a liquid droplet is ejected by generating a bubble in ink with heating, a system where a liquid droplet is ejected utilizing an ultrasonic wave and a system wherein a liquid droplet is ejected by an electrostatic attractive force.

Also, an aqueous ink, an oily ink or a solid (melting type) ink is used as an ink jet recording ink.

It is requested for a dye used in the ink jet recording ink to have good solubility or dispersibility to a solvent, to be capable of recoding in high density, to have good hue, to have good fastnesses to light, heat and active gas (for example, oxidizing gas, e.g., NOx or ozone, or SOx) in environment, to be excellent in fastnesses to water and chemicals, to have a good fixing property to an image-receiving material so as to be hardly blurred, to have good preservability as an ink, to be nonpoisonous, to have high purity, and to be available inexpensively.

Toner ordinarily obtained by dispersing a coloring agent in a resin particle is widely used in color copiers or color laser printers utilizing an electrophotographic process. Performances required to the color toner include absorption characteristics capable of achieving preferable color reproduction area, high transmittance (transparency), which is particularly a problem in the case of using it in an overhead projector (OHP), and various fastnesses under conditions of use environment. Toners obtained by dispersing a pigment as the coloring agent in a particle are described in JP-A-62-157051 (the term "JP-A" as used herein means an "unexamined published Japanese patent application"), JP-A-62-255956 and JP-A-6-118715. Although these toners are excellent in light fastness, they are apt to aggregate due to their insolubility and cause problems of decrease in transparency of a color layer and change in hue of transmitting color. On the other hand, toners using a dye as the coloring agent are described in JP-A-3-276161, JP-A-7-209912 and JP-A-8-123085. However, these toners have a problem in the light fastness though they exhibit high transparency and no hue change.

The heat-sensitive transfer recording has advantages in that an apparatus is small-sized and capable of reducing a cost, in that operation and maintenance are easy and in that a running cost is inexpensive. Performances required to the dye used in the heat-sensitive transfer recording include absorption characteristics capable of achieving preferable color reproduction area, compatibility between heat transferability and fixing property after the transfer, heat stability and various fastnesses of the image obtained. However, dyes hitherto known do not satisfy all of these performances. For instance, a heat-sensitive transfer recording material and an image forming method wherein a chelate is formed between a heat diffusible dye and a transfer metal ion previously incorporated into an image-receiving material for the purpose of increasing the fixing property and light fastness are described in JP-A-60-2398. However, the absorption characteristics of the chelate dye formed are at an unsatisfied level and an environmental problem due to the use of transition metal may occur.

Since high transparency is required to color filter, a method referred to as a dying method of conducting coloration using a dye has been used. For instance, a method wherein a photoresist capable of being dyed is pattern-exposed and developed to form a pattern and the pattern is then dyed with a dye of filter color is repeatedly performed in series with all filter colors to produce a color filter. Other than the dying method, a color filter can be produced by a method of using a positive resist as described in U.S. Pat. No. 4,808,501 and JP-A-6-35182. Although these methods provide high transparency and are excellent in view of optical characteristics of color filter because of using the dye, they have limitations on the light fastness, heat fastness and the like. Thus, a dye excellent in various fastnesses and having high transparency has been desired. On the other hand, a method of using an organic pigment that is excellent in the light fastness and heat fastness in place of the dye is also well known. However, it is hard in the color filter using the pigment to achieve the optical characteristics obtained by using the dye.

It is very difficult to find a dye that satisfies these requirements at a high level. In particular, it is strongly requested for a dye to have a preferable cyan hue and to have good fastnesses to light, humidity and heat, particularly, fastness to oxidizing gas, for example, ozone in environment, in the case of printing on an image-receiving material having an ink-receptive layer containing porous white inorganic pigment particles. Also, it is strongly desired for the dye to satisfy preservation stability of ink described hereinafter.

A cyan dye skeleton for use in the inkjet recording ink includes, for example, a phthalocyanine type, an anthraquinone type and a triphenylmethane type. Although phthalocyanine compounds, which are excellent in hue and light fastness, are ordinarily used, they do not have sufficient fastness to oxidizing gas, particularly ozone and are unsatisfactory in view of ink stability. Therefore, further improvements are requested.

Representative phthalocyanine dyes most widely reported and utilized include phthalocyanine derivatives classified into [1] to [6] shown below.

[1] Copper phthalocyanine type dye, for example, Direct Blue 86 or Direct Blue 87 (for example, a mixture of compounds represented by formula Cu—Pc—$(SO_3Na)_m$, wherein m represents 1 to 4). The term "Pc" as used in the above formula represents a phthalocyanine skeleton (hereinafter the same).

[2] Phthalocyanine type dye, for example, Direct Blue 199 and described, for example, in JP-A-62-190273, JP-A-63-28690, JP-A-63-306075, JP-A-63-306076, JP-A-2-131983, JP-A-3-122171, JP-A-3-200883 and JP-A-7-138511 (for example, a mixture of compounds represented by formula Cu—Pc—$(SO_3Na)_m(SO_2NH_2)_n$, wherein m+n represents 1 to 4).

[3] Phthalocyanine type dye described, for example, in JP-A-63-210175, JP-A-63-37176, JP-A-63-304071, JP-A-5-171085 and WO 00/08102 (for example, a compound represented by formula Cu—Pc—$(CO_2H)_m(CONR_1R_2)_n$, wherein m+n represents a number of 0 to 4).

[4] Phthalocyanine type dye described, for example, in JP-A-59-30874, JP-A-1-126381, JP-A-1-190770, JP-A-6-16982, JP-A-7-82499, JP-A-8-34942, JP-A-8-60053, JP-A-8-113745, JP-A-8-310116, JP-A-10-140063, JP-A-10-298463, JP-A-11-29729, JP-A-11-320921, EP 173,476A2, EP 468,649A1, EP 559309A2, EP 596,383A1, DE 3,411,476, U.S. Pat. No. 6,086,955, WO 99/13009 and British Patent 2,341,868A (for example, a compound represented by formula Cu—Pc—$(SO_3H)_m(SO_2NR_1R_2)_n$, wherein m+n represents a number of 0 to 4, provided that m is not 0).

[5] Phthalocyanine type dye described, for example, in JP-A-60-208365, JP-A-61-2772, JP-A-6-57653, JP-A-8-60052, JP-A-8-295819, JP-A-10-130517, JP-A-11-72614, JP-T-11-515047 (the term "JP-T" as used herein means a published Japanese translation of a PCT patent application"), JP-T-11-515048, EP 196,901A2, WO 95/29208, WO 98/49239, WO 98/49240, WO 99/50363 and WO 99/67334 (for example, a compound represented by formula Cu—Pc—$(SO_3H)_l(SO_2NH_2)_m(SO_2NR_1R_2)_n$, wherein l+m+n represents a number of 0 to 4).

[6] Phthalocyanine type dye described, for example, in JP-A-59-22967, JP-A-61-185576, JP-A-1-95093, JP-A-3-195783, EP 649,881A1, WO 00/08101 and WO 00/08103 (for example, a compound represented by formula Cu—Pc—$(SO_2NR_1R_2)_n$, wherein n represents a number of 1 to 5).

Though phthalocyanine dyes as represented by Direct Blue 87 or Direct Blue 199, which is ordinarily widely used at present, and described in patents described above have a feature excellent in light fastness in comparison with a magenta dye or a yellow dye, they are apt to cause a problem resulting from solubility of the dye. For instance, dissolution defect occurs at the time of production to cause production trouble and insoluble substances are deposited at the time of storage or use of the product to cause a problem often. Particularly, in the inkjet recording described above, because of poor preservation stability of the ink, for example, formation of the deposition of dye, clogging of printing head and ejection defect occur to result in sever deterioration of print image.

Further, the dyes are apt to cause fading upon oxidizing gas, for example, ozone, which recently comes up often on environmental problem, thereby causing a problem in that print density considerably decreases.

The inkjet recording rapidly increases its field of use and is using more and more for home, SOHO and business purposes. As a result of exposure to various use conditions and use circumstances, occurrence of trouble on the preservation stability of ink due to the dissolution defect of cyan dye and a problem on the fading of print image caused by exposure to light or active gas in environment may increase. Therefore, a dye, which has particularly good hue, is excellent in light fastness and fastness to active gas (for example, oxidizing gas, e.g., NOx or ozone, or SOx) in environment, and has high solubility and an ink composition using such a dye have been strongly desired.

Phthalocyanine dyes having ozone gas resistance are hitherto described, for example, in JP-A-3-103484, JP-A-4-39365 and JP-A-2000-303009. However, these dyes do not achieve simultaneous pursuit of hue and fastnesses to light and oxidizing gas at present. In particular, there is no report on property of dye serving as a guideline for the ozone gas resistance. Further, though the use of phthalocyanine is described, for example, in EP 1,243,626A1 and EP 1,243,627A1, the required performance does not reach at satisfactory level. Specifically, the fastness largely depends on density (fastness is improved only in a high density area), and in the high density area, light is reflected due to the occurrence of bronze phenomenon, whereby not only optical density of the recording image decreases but also hue of the recording image largely differs from the desired hue.

Moreover, when azaphthalocyanine compound described in WO 02/34844 is used as a cyan dye in ink, hue of the azaphthalocyanine compound considerably shifts to a shorter wavelength side and as a result, absorption characteristics capable of achieving preferable color reproduction area are not satisfied. Although change of a center metal (for example, Ni) of the metal phthalocyanine compound is somewhat effective for improvement in the hue (shifting to a longer wavelength side), the absorption characteristics capable of achieving preferable color reproduction area are still not at a satisfying level, and a further problem of material safety due to the use of Ni may occur.

An aqueous ink is mainly used as ink for inkjet recording system (hereinafter referred to as an "inkjet recording ink"). The aqueous ink is essentially composed of a dye, water and an organic solvent, and contains water as a main solvent from the standpoint of odor and safety to the human body and ambient surrounding. As the dye, a water-soluble dye, for example, an acid dye, a basic dye, a reactive dye or a direct dye is employed.

With respect to the inkjet recording ink (and dye), the characteristics required include those described below.

Specifically, the characteristics include, for instance, that the ink has appropriate physical properties, for example, viscosity, surface tension, relative conductivity, density and pH, that the ink is excellent in preservation stability for a long period of time, that the ink has high dissolution stability of dissolving components to prevent clogging of nozzle, that the ink is excellent in quick-dry property on an image-receiving material, and that the ink provides a clear recording image excellent in light fastness and water resistance. However, hitherto inks do not satisfy all of these characteristics.

In an aqueous ink conventionally utilized, a water-soluble dye is used. Therefore, the aqueous ink has a large problem in the water resistance and when the recording image is watered, the dye is dissolved out to cause blurring or disappearance of the recording image. Particularly, the clogging of head is also a large problem in the inkjet recording system and various investigations mainly directing to improvement in preservation stability of the ink are made at present.

For instance, ink using a pigment or an oil-soluble dye as the coloring agent and a method of adding, for example, an organic solvent or a resin to an aqueous ink using a water-soluble dye have been investigated. However, the ink using a pigment is poor in dispersion stability and has problems of inferior preservation stability and occurrence of clogging of nozzle. The ink using an oil-soluble dye has problem of environmental health, for example, odor, and a large extent of ink blur to cause degradation of image quality, because the ink contains the organic solvent. Further, the ink containing an additive also has problems of inferior preservation stability, occurrence of clogging of nozzle and inferior ink ejection due to high viscosity of the ink.

Phthalocyanine dyes improved in dispersion stability and having excellent preservation stability are described in JP-A-2000-303014 and JP-A-2000-313837. However, these dyes still do not achieve simultaneous pursuit of hue and fastnesses to light and oxidizing gas and fail to provide a product sufficiently meeting the requirements of the market.

Recently, inks using aqueous dispersion comprising as a dispersoid, a polyester resin colored with a dye or pigment are described, for example, in JP-A-6-340835, JP-A-12-239584 and WO 00/08102. However, these inks still not sufficient to resolve the above-described problems. Further, it is described that with respect to the dye, its compatibility with the resin, which directly relates to decrease in image density, deterioration of water resistance, preservation stability, clogging of nozzle and the like, and control of an average particle size of the colored resin fine particles remain to be solved.

Regarding a phthalocyanine compound (mixture), as described, for example, in WO 00/17275, WO 00/08103, WO 00/08101, WO 98/41853 and JP-A-10-36471, in general, an unsubstituted phthalocyanine compound is sulfonated and an alkali metal salt, for example, a sodium salt, of the sulfonated compound is used as it is as a water-soluble dye. On the other hand, in the case where it is used as an oil-soluble dye, the sulfonated compound is subjected to reactions for sulfonylchloridation and amidation to synthesis the desired dye.

In an aqueous cyan color ink for inkjet heretofore employed, a water-soluble dye, for example, a copper phthalocyanine compound having as a substituent, a sulfo group or a salt of sulfo group prepared by sulfonation of a copper phthalocyanine compound is used.

In such a case, the sulfonation may occur on any position of the phthalocyanine nucleus and further, it is difficult to control a number of the sulfo group introduced. Therefore, when the sulfo group is introduced under such conditions, a position and a number of the sulfo group introduced in the product cannot be specified and a mixture of products different in the number of substituent and the position of substituent is inevitably obtained.

As a result, a component having low solubility, for example, a component having zero or only one sulfo group on the phthalocyanine nucleus exists in the mixture, and when the mixture is used as a water-soluble dye, solubility tends to be insufficient. Therefore, it has been desired to improve the solubility.

On the other hand, as the oil-soluble dye, a phthalocyanine compound having a sulfamoyl group and/or an ammonium salt of a sulfonic acid containing an ion pair between a sulfo group and an amine compound is known. The phthalocyanine compound is produced by conducting chlorosulfonation of a metal phthalocyanine compound with chlorosulfonic acid and then reaction of the resulting chlorosulfonated product of phthalocyanine compound collected with an amine compound (described, for example, in Yutaka Hosoda, Riron Seizo Senryo Kagaku, Fifth Edition, pages 798 to 799, published on Jul. 15, 1968, Gihodo Shuppan Co., Ltd.). According to the production method, in the reaction between the chlorosulfonated product of phthalocyanine compound and the amine compound, the chlorosulfonyl groups are partially hydrolyzed to form a sulfo group in addition to the formation of a sulfonic amido group, or a phthalocyanine compound including an ammonium salt of a sulfonic acid containing an ion pair between a sulfo group and an amine compound is obtained.

When the phthalocyanine compound thus-obtained is used as a dye for inkjet recording, a problem causes in that the solubility thereof in a solvent of the ink is so low that the preparation of ink cannot be carried out or ink having necessary concentration cannot be prepared. In addition, due to the remaining sulfo group, blur occurs when printed on plain paper, water resistance of recording image is poor, and other various characteristics are adversely affected in some cases.

As described above, since various characteristics of the ink for use in the inkjet recording system particularly depend greatly on the inherent characteristics of dye, it is very important to select a dye satisfying the various conditions described above.

In JP-A-2003-34758, a phthalocyanine compound (mixture) having a pyridine ring, a pyrazine ring and a benzene ring is described. However, a phthalocyanine compound in which a substituent and a substitution position are specified and which is further improved in fastness (particularly ozone resistance) has been required.

In JP-A-2004-2670, a dye mixture having fastnesses to light, heat, humidity and active gas in environment is described. However, since the dye mixture has an ionic hydroxy group, it has low solubility in an oily solvent, is poor in dispersibility, causes blur when printed on plain paper, and deteriorates water resistance of recording image. Therefore, further improvements have been required.

SUMMARY OF THE INVENTION

The present invention seeks to resolve the problems described above and to achieve the objects described below.

More specifically, an object of the invention is to provide a novel ink having absorption characteristics excellent in color reproducibility and sufficient fastnesses to light, heat, humidity and active gas in environment.

Another object of the invention is to provide a variety of inks having the above-described properties and being capable of using, for example, as printing ink for inkjet recording.

A further object of the invention is to provide an inkjet recording ink capable of forming an image having preferable hue and good fastness to light and active gas in environment, particularly ozone gas and being excellent in water resistance and particularly having excellent preservation stability for a long period of time, an inkjet recording method and a method of improving preservation stability of an image formed by using a substituted phthalocyanine compound (mixture).

A still further object of the invention is to provide a method of making an image fast for improving ozone gas discoloration resistance of image recorded by utilizing the above-described inkjet recording method.

As a result of the detailed investigations of phthalocyanine compound, which has preferable hue and solubility and good preservation stability for a long period of time as ink and is excellent in light fastness and gas (particularly ozone gas) fastness, the present inventors have found that the objects described above can be achieved by a phthalocyanine compound (and a mixture thereof), which is heretofore not known and has a specific structure, to complete the present invention. The objects described above are achieved in the following manner.

(1) A dye mixture comprising a plurality of different dyes represented by formula (I):

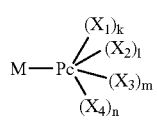

Formula (I)

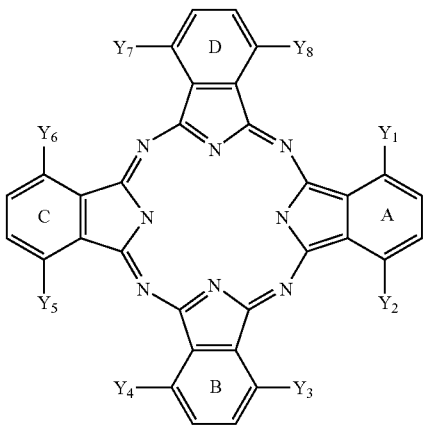

Formula (II)

wherein M represents a hydrogen atom or a metal atom or an oxide, a hydroxide or a halide thereof;

Pc represents a (k+l+m+n) valent phthalocyanine nucleus represented by formula (II);

$X_1$, $X_2$, $X_3$ and $X_4$ each independently represents a substituent selected from —SO—$R_1$, —$SO_2$—$R_1$, —$SO_2NR_2R_3$, —$CONR_2R_3$, —$CO_2$—$R_1$, and —CO—$R_1$, and at least one of the substituents exists on each of four benzene rings A, B, C and D in formula (II) of the phthalocyanine nucleus, provided that $X_1$, $X_2$, $X_3$ and $X_4$ are not the same simultaneously, that at least one of $X_1$, $X_2$, $X_3$ and $X_4$ is a substituent having two or more carbon atoms, that a total number of carbon atoms included in the substituents represented by $X_1$, $X_2$, $X_3$ and $X_4$ is 8 or more and that the dye does not contain an ionic hydrophilic group in a molecule thereof;

$R_1$ represents a substituted or unsubstituted alkyl group, a substituted or unsubstituted aryl group or a substituted or unsubstituted heterocyclic group;

$R_2$ represents a hydrogen atom, a substituted or unsubstituted alkyl group, a substituted or unsubstituted aryl group or a substituted or unsubstituted heterocyclic group;

$R_3$ represents a substituted or unsubstituted alkyl group, a substituted or unsubstituted aryl group or a substituted or unsubstituted heterocyclic group;

k represents an integer of 0<k<8;

l represents an integer of 0<l<8;

m represents an integer of $0 \leq m < 8$;

n represents an integer of $0 \leq n < 8$, provided that k, l, m and n satisfy $4 \leq k+l+m+n \leq 8$; and $Y_1$, $Y_2$, $Y_3$, $Y_4$, $Y_5$, $Y_6$, $Y_7$ and $Y_8$ each independently represents a hydrogen atom or a monovalent substituent, which may have a substituent (2) The dye mixture as described in (1) above, wherein the phthalocyanine nucleus represented by formula (II) is a phthalocyanine nucleus represented by formula (III):

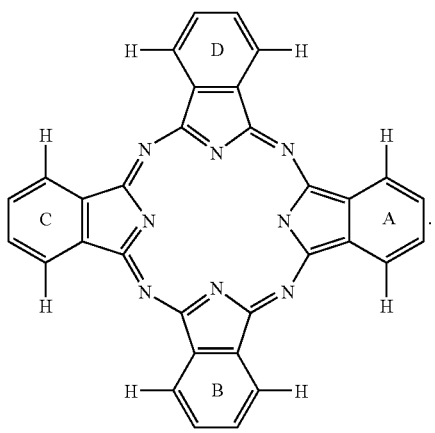

Formula (III)

(3) The dye mixture as described in (1) or (2) above, wherein $X_1$, $X_2$, $X_3$ and $X_4$ in the dye represented by formula (I) each independently represents a substituent selected from $-SO-R_1$, $-SO_2-R_1$ and $-SO_2NR_2R_3$, and at least one of the substituents exists on each of four benzene rings A, B, C and D in formula (II) or formula (III) of the phthalocyanine nucleus.

(4) The dye mixture as described in (2) above, wherein the dye represented by formula (I) is a dye represented by formula (IV):

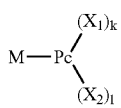

Formula (IV)

wherein M represents a hydrogen atom or a metal atom or an oxide, a hydroxide or a halide thereof, Pc represents a (k+l) valent phthalocyanine nucleus represented by formula (III);

$X_1$ and $X_2$ each independently represents a substituent selected from $-SO-R_1$, $-SO_2-R_1$ and $-SO_2NR_2R_3$, and at least one of the substituents exists on each of four benzene rings A, B, C and D in formula (III) of the phthalocyanine nucleus, provided that $X_1$ and $X_2$ are not the same simultaneously, that at least one of $X_1$ and $X_2$ is a substituent having two or more carbon atoms, that a total number of carbon atoms included in the substituents represented by $X_1$ and $X_2$ is 8 or more and that the dye does not contain an ionic hydrophilic group in a molecule thereof;

$R_1$ represents a substituted or unsubstituted alkyl group, a substituted or unsubstituted aryl group or a substituted or unsubstituted heterocyclic group;

$R_2$ represents a hydrogen atom, a substituted or unsubstituted alkyl group, a substituted or unsubstituted aryl group or a substituted or unsubstituted heterocyclic group;

$R_3$ represents a substituted or unsubstituted alkyl group, a substituted or unsubstituted aryl group or a substituted or unsubstituted heterocyclic group;

k represents an integer of 0<k<8; and l represents an integer of 0<l<8, provided that k and l satisfy $4 \leq k+l \leq 8$.

(5) An ink comprising a dye mixture as described in any of (1) to (4) above.

(6) An inkjet recording ink comprising an ink as described in (5) above.

(7) An inkjet recording method, which comprises forming an image with an inkjet recording ink as described in (6) above on an image-receiving material comprising a support and an ink-receiving layer containing white inorganic pigment particles.

(8) A method for improving ozone gas resistance of a color image material formed by utilizing an inkjet recording ink as described in (6) above.

DETAILED DESCRIPTION OF THE INVENTION

The present invention will be described in more detail below. The term "ink" used in the present invention means a composition containing a coloring agent, for example, a dye or a pigment, and is preferably used for the formation of image.

[Production Method of Dye Mixture and Dye Mixture Obtained by the Production Method]

A production method of the phthalocyanine dye mixture according to the invention (which has the same meaning as the dye mixture according to the invention) includes a method of producing the dye mixture by reacting phthalonitrile (o-phthalonitrile) and a phthalic acid derivative in which a soluble group or a precursor thereof is previously introduced (hereinafter a substituted phthalonitrile, a substituted phthalic acid diamide, a substituted phthalimide, a substituted phthalic acid and a salt thereof and a substituted phthalic anhydride are each referred to as the "phthalic acid derivative") with a metal derivative to produce the dye mixture. According to the production method, since a soluble group or a precursor thereof is previously introduced into a phthalic acid derivative as a raw material, it can be performed, for example, to introduce the soluble group or the precursor thereof into four benzene rings without omission or to introduce a specific number of the desired soluble group.

Further, an oxidation potential can be adjusted higher (more electropositive) by introducing an electron-withdrawing soluble group as described hereinafter. Therefore, a dye mixture, which has absorption characteristics excellent in color reproducibility as a dye for three primary colors and sufficient fastnesses to light, heat, humidity and active gas in environment and is excellent in solubility, can be produced.

In particular, it is preferred to use at least two kinds of the phthalic acid derivatives wherein the soluble groups or precursors thereof are different from each other in the production method of the dye mixture according to the invention.

Consequently, a dye mixture wherein the kind and connection state of the soluble groups are different with a distribution determined by a feeding ratio of the phthalic acid derivatives used is obtained. More specifically, as for the structure of phthalocyanine compound obtained, for example, an asymmetric phthalocyanine compound obtained by decreasing symmetry of the molecule than the case of introducing the same soluble groups into four benzene rings and/or by introducing randomly different soluble groups has more increased solubility in comparison with a symmetric phthalocyanine compound. Accordingly, the invention also provides a method for improving the solubility of a dye mixture.

As a result, when the dye mixture of the invention is used for an inkjet recording ink, for example, a preferable inkjet recording ink having improvements in preservation stability and recovery from clogging can be provided.

In the production method of the dye mixture according to the invention, [1] a substituted phthalonitrile (Compound A shown below), [2] a substituted diiminoisoindoline (Compound B shown below), [3] a substituted phthalic acid diamide (Compound C shown below), [4] a substituted phthalimide (Compound D shown below), [5] a substituted phthalic acid and a salt thereof (Compound E shown below) or [6] a substituted phthalic anhydride (Compound F shown below), represented by formula (V) shown below can be preferably used as the phthalic acid derivative for a raw material.

The dye mixture represented by formula (I) described above can be produced by reacting a compound having a soluble group or a precursor thereof with a metal derivative represented by formula (VI) shown below as the metal derivative.

When X' in Compounds A to F as the phthalic acid derivative for a raw material is a precursor of soluble group, the precursor of soluble group is converted to a soluble group after the formation of phthalocyanine ring, whereby the dye mixture represented by formula (I) described above according to the invention can be produced.

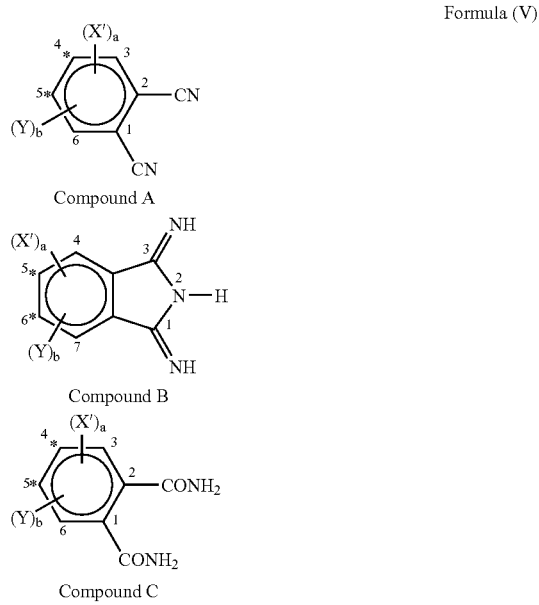

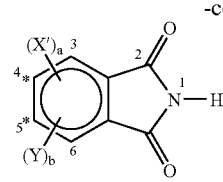

Compound D

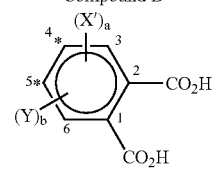

Compound E

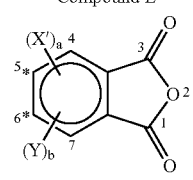

Compound F

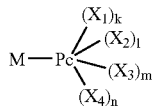

Formula (VI)

Formula (I)

In Compounds A to F, X' represents a soluble group or a precursor thereof

In formula (VI), M represents a hydrogen atom or a metal atom or an oxide, hydroxide or halide thereof. Z represents a halogen atom, acetate anion, acetylacetonate or a monovalent or divalent ligand, for example, oxygen d represents an integer of 1 to 4.

The phthalic acid derivative (Compounds A to F) represented by Formula (V) for a raw material will be described below.

The term "soluble group" means a substituent imparting solubility to the phthalocyanine dye. In the case where oil-solubility is imparted to the phthalocyanine dye by introducing a soluble group, the soluble group represents an oil-soluble group.

With respect to a number of the oil-soluble group, it is preferred that the phthalocyanine compound has at least one substituent having two or more carbon atoms (preferably 50 or less, more preferably 30 or less) per molecule. It is particularly preferred that a total number of the carbon atoms included in the substituents per molecule of the phthalocyanine compound is 8 or more (preferably 200 or less, more preferably 120 or less). Among them, it is most preferred that a total number of the carbon atoms included in the substituents per molecule of the phthalocyanine compound is 10 or more (preferably 120 or less, more preferably 100 or less).

An ionic hydrophilic group ordinarily includes, for example, a sulfo group, a carboxy group, a phosphono group and a quaternary ammonium group. However, in the invention, the term "ionic hydrophilic group" means a substituent capable of being easily dissociated to from an ion (for example, a sulfo group or a phosphono group) or a substituent present in the form of a salt, and a free substituent having pK of 3 or more (for example, a carboxy group) is excluded.

The term "precursor of soluble group" mans a substituent capable of being converted to a soluble group by a reaction after the formation of phthalocyanine ring. Examples of the substituent include a reactive substituent, for example, a hydroxy group, a halogen atom, a mercapto group, an amino group, an acylamino group, an alkoxycarbonyl group, an alkenyl group or an imido group, and a substituent having the reactive substituent as a substituent.

In Compounds A to F, X' is preferably a substituent having a Hammett's substituent constant σp value of 0.4 or more.

More specifically, X' is preferably an oil-soluble group, particularly preferably —SO—$R_1$, —$SO_2$—$R_1$, —$SO_2NR_2R_3$, —$CONR_2R_3$, —$CO_2$—$R_1$ or —CO—$R_1$, and among them, —$SO_2$—$R_1$ or —$SO_2NR_2R_3$ is more preferred and —$SO_2$—$R_1$ is most preferred.

$R_1$ preferably represents a substituted or unsubstituted alkyl group, a substituted or unsubstituted aryl group or a substituted or unsubstituted heterocyclic group, and among them, a substituted alkyl group, a substituted aryl group or a substituted heterocyclic group is most preferred.

$R_2$ preferably represents a hydrogen atom, a substituted or unsubstituted alkyl group, a substituted or unsubstituted aryl group or a substituted or unsubstituted heterocyclic group, and among them, a hydrogen atom, a substituted alkyl group, a substituted aryl group or a substituted heterocyclic group is most preferred.

$R_3$ preferably represents a substituted or unsubstituted alkyl group, a substituted or unsubstituted aryl group or a substituted or unsubstituted heterocyclic group, and among them, a substituted alkyl group, a substituted aryl group or a substituted heterocyclic group is most preferred.

The substituted or unsubstituted alkyl group represented by any one of $R_1$, $R_2$ and $R_3$ is preferably an alkyl group having from 1 to 12 carbon atoms. From the standpoint of increasing the solubility of dye and the stability of ink, a branched alkyl group is preferred and an alkyl group having an asymmetric carbon (using in a racemic form) is particularly preferred.

Examples of the substituent include those described hereinafter as a substituent in the case where $R_1$, $R_2$, $R_3$ or Y may further have a substituent. Among them, a hydroxy group, an ether group, an ester group, a cyano group, an amido group or a sulfonamido group is particularly preferred since such a group enhance association of dye to improve the fastness. In addition, the alkyl group may have a halogen atom.

The substituted or unsubstituted cycloalkyl group represented by any one of $R_1$, $R_2$ and $R_3$ is preferably a cycloalkyl group having from 5 to 12 carbon atoms. From the standpoint of increasing the solubility of dye and the stability of ink, a cycloalkyl group having an asymmetric carbon (using in a racemic form) is particularly preferred.

Examples of the substituent include those described hereinafter as a substituent in the case where $R_1$, $R_2$, $R_3$ or Y may further have a substituent. Among them, a hydroxy group, an ether group, an ester group, a cyano group, an amido group or a sulfonamido group is particularly preferred since such a group enhance association of dye to improve the fastness. In addition, the alkyl group may have a halogen atom.

The substituted or unsubstituted alkenyl group represented by any one of $R_1$, $R_2$ and $R_3$ is preferably an alkenyl group having from 2 to 12 carbon atoms. From the standpoint of increasing the solubility of dye and the stability of ink, a branched alkenyl group is preferred and an alkenyl group having an asymmetric carbon (using in a racemic form) is particularly preferred.

Examples of the substituent include those described hereinafter as a substituent in the case where $R_1$, $R_2$, $R_3$ or Y may further have a substituent. Among them, a hydroxy group, an ether group, an ester group, a cyano group, an amido group or a sulfonamido group is particularly preferred since such a group enhance association of dye to improve the fastness. In addition, the alkyl group may have a halogen atom.

The substituted or unsubstituted aralkyl group represented by any one of $R_1$, $R_2$ and $R_3$ is preferably an aralkyl group having from 7 to 18 carbon atoms. From the standpoint of increasing the solubility of dye and the stability of ink, a branched aralkyl group is preferred and an aralkyl group having an asymmetric carbon (using in a racemic form) is particularly preferred.

Examples of the substituent include those described hereinafter as a substituent in the case where $R_1$, $R_2$, $R_3$ or Y may further have a substituent. Among them, a hydroxy group, an ether group, an ester group, a cyano group, an amido group or a sulfonamido group is particularly preferred since such a group enhance association of dye to improve the fastness. In addition, the alkyl group may have a halogen atom.

The substituted or unsubstituted aryl group represented by any one of $R_1$, $R_2$ and $R_3$ is preferably an aryl group having from 6 to 12 carbon atoms.

Examples of the substituent include those described hereinafter as a substituent in the case where $R_1$, $R_2$, $R_3$ or Y may further have a substituent. Among them, an electron-withdrawing group is preferred since such a group makes an oxidation potential of the dye positive to improve the fastness. Specifically, a halogen atom, a heterocyclic group, a cyano group, a carboxy group, an acylamino group, a sulfonamido group, a sulfamoyl group, a carbamoyl group, a sulfonyl group, an imido group, an acyl group, a sulfo group and a quaternary ammonium group are preferred, and a cyano group, a carboxy group, a sulfamoyl group, a carbamoyl group, a sulfonyl group, an imido group, an acyl group, a sulfo group and a quaternary ammonium group are more preferred.

The substituted or unsubstituted heterocyclic group represented by any one of $R_1$, $R_2$ and $R_3$ is preferably a 5-membered or 6-membered ring and the ring may be further condensed. Also, the heterocyclic group may be an aromatic heterocyclic group or a non-aromatic heterocyclic group.

Examples of the heterocyclic group represented by any one of $R_1$, $R_2$ and $R_3$ are shown below in the form of a heterocyclic ring by omitting a substitution position. The substitution position is not limited and, for example, in the case of pyridine, the 2-position, 3-position or 4-position can be substituted. Examples of the heterocyclic ring include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine and thiazoline.

In particular, an aromatic heterocyclic group is preferred. Preferred examples thereof, shown in the same manner as above, include pyridine, pyrazine, pyrimidine, pyridazine, triazine, pyrazole, imidazole, benzimidazole, triazole, thiazole, benzothiazole, isothiazole, benzisothiazole and thiadiazole.

The heterocyclic group may have a substituent and examples of the substituent include those described hereinafter as a substituent in the case where $R_1$, $R_2$, $R_3$ or Y may further have a substituent.

Preferred substituents are same as the above-described preferred substituents for the aryl group, and more preferred substituents are same as the above-described more preferred substituents for the aryl group.

In Compounds A to F, a represents a number of the substituent represented by X' and is an integer of 1 to 4b represents a number of the substituent represented by Y and is an integer that satisfies a relation of a+b=4a is preferably 1 or 2 and more preferably 1. When a is 1 or 2, it is preferred that the positions substituted with X' are 4-position and/or 5-position in Compounds A, C, D and E and 5-position and/or 6-position in Compounds B and F, respectively. The position is indicated by an asterisk (*) in Formula (V), and will be called β-position hereinafter.

In Compounds A to F, Y represents a hydrogen atom or a monovalent substituent. Examples of the monovalent substituent include a halogen atom, an alkyl group, an alkenyl group, an aralkyl group, an aryl group, a heterocyclic group, a cyano group, a hydroxy group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group and an acyl group. These groups each may further have a substituent.

Y is preferably a hydrogen atom, a halogen atom, an alkyl group, an aryl group, a cyano group, an alkoxy group, an amido group, a ureido group, a sulfonamido group, a carbamoyl group, a sulfamoyl group or an alkoxycarbonyl group, more preferably a hydrogen atom, a halogen atom or a cyano group, and most preferably a hydrogen atom. A number of carbon atoms included in the monovalent substituent is preferably 2 or more.

When any one of $R_1$, $R_2$, $R_3$ and Y represents a group capable of further having a substituent, examples of the substituent are set forth below.

Examples of the substituent include a straight-chain or branched alkyl group having from 1 to 12 carbon atoms, a straight-chain or branched aralkyl group having from 7 to 18 carbon atoms, a straight-chain or branched alkenyl group having from 2 to 12 carbon atoms, a straight-chain or branched alkynyl group having from 2 to 12 carbon atoms, a straight-chain or branched cycloalkyl group having from 3 to 12 carbon atoms, a straight-chain or branched cycloalkenyl group having from 3 to 12 carbon atoms (of these groups, those having a branched chain are preferred from the standpoint of increasing the solubility of dye and the stability of ink, and those having an asymmetric carbon are particularly preferred, for example, methyl, ethyl, propyl, isopropyl, sec-butyl, tert-butyl, 2-ethylhexyl, 2-methylsulfonylethyl, 3-phenoxypropyl, trifluoromethyl or cyclopentyl), a halogen atom (e.g., chlorine or bromine), an aryl group (e.g., phenyl, 4-tert-butylphenyl or 2,4-di-tert-amylphenyl), a heterocyclic group (e.g., imidazolyl, pyrazolyl, triazolyl, 2-furyl, 2-thienyl, 2-pyrimidinyl or 2-benzothiazolyl), a cyano group, a hydroxy group, a nitro group, a carboxy group, an amino group, an alkyloxy group (e.g., methoxy, ethoxy, 2-methoxyethoxy or 2-methanesulfonylethoxy), an aryloxy group (e.g., phenoxy, 2-methylphenoxy, 4-tert-butylphenoxy, 3-nitrophenoxy, 3-tert-butyloxycarbamoylphenoxy or 3-methoxycarbonylphenoxy), an acylamino group (e.g., acetamido, benzamido or 4-(3-tert-butyl-4-hydroxyphenoxy)butanamido), an alkylamino group (e.g., methylamino, butylamino, diethylamino or methylbutylamino), an anilino group (e.g., phenylamino or 2-chloroanilino), a ureido group (e.g., phenylureido, methylureido or N,N-dibutylureido), a sulfamoylamino group (e.g., N,N-dipropylsulfamoylamino), an alkylthio group (e.g., methylthio, octylthio or 2-phenoxyethylthio), an arylthio group (e.g., phenylthio, 2-butoxy-5-tert-octylphenylthio or 2-carboxyphenylthio), an alkyloxycarbonylamino group (e.g., methoxycarbonylamino), a sulfonamido group (e.g., methanesulfonamido, benzenesulfonamido or p-toluenesulfonamido), a carbamoyl group (e.g., N-ethylcarbamoyl or N,N-dibutylcarbamoyl), a sulfamoyl group (e.g., N-ethylsulfamoyl, N,N-dipropylsulfamoyl or N-phenylsulfamoyl), a sulfonyl group (e.g., methanesulfonyl, octanesulfonyl, benzenesulfonyl or toluenesulfonyl), an alkyloxycarbonyl group (e.g., methoxycarbonyl or butyloxycarbonyl), a heterocyclic oxy group (e.g., 1-phenyltetrazol-5-oxy or 2-tetrahydropyranyloxy), an azo group (e.g., phenylazo, 4-methoxyphenylazo, 4-pivaloylaminophenylazo or 2-hydroxy-4-propanoylphenylazo), an acyloxy group (e.g., acetoxy), a carbamoyloxy group (e.g., N-methylcarbamoyloxy or N-phenylcarbamoyloxy), a silyloxy group (e.g., trimethylsilyloxy or dibutylmethylsilyloxy), an aryloxycarbonylamino group (e.g., phenoxycarbonylamino), an imido group (e.g., N-succinimido or N-phthalimido), a heterocyclic thio group (e.g., 2-benzothiazolylthio, 2,4-di-phenoxy-1,3,5-triazole-6-thio or 2-pyridylthio), a sulfinyl group (e.g., 3-phenoxypropylsulfinyl), a phosphonyl group (e.g., phenoxyphosphonyl, octyloxyphosphonyl or phenylphosphonyl), an aryloxycarbonyl group (e.g., phenoxycarbonyl), and an acyl group (e.g., acetyl, 3-phenylpropanoyl or benzoyl).

Of the phthalic acid derivatives (Compounds A to F) represented by formula (V) according to the invention, phthalic acid derivatives (Compounds G to L) having the structures represented by formula (VII) shown below are preferred.

Formula (VII)

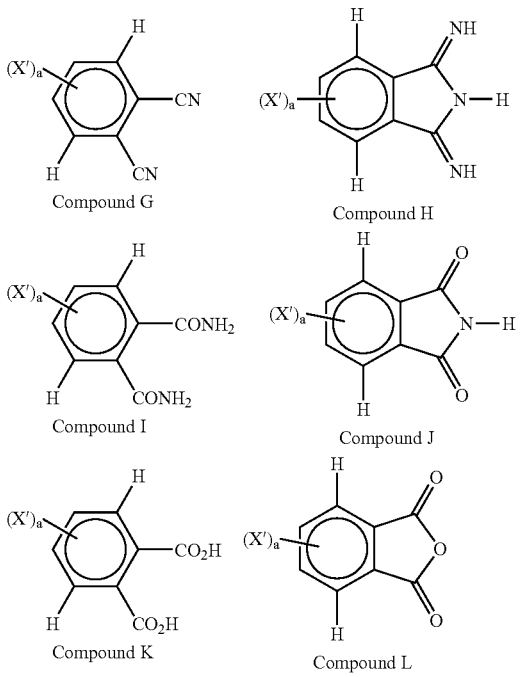

Compound G
Compound H
Compound I
Compound J
Compound K
Compound L

In formula (VII), X' represents a substituent selected from —SO—$R_1$, —$SO_2$—$R_1$, —$SO_2NR_2R_3$, —$CONR_2R_3$, —$CO_2$—$R_1$ and —CO—$R_1$.

More specifically, X' is preferably —$SO_2$—$R_1$, —$SO_2NR_2R_3$, —$CONR_2R_3$ or —$CO_2$—$R_1$, particularly preferably —$SO_2$—$R_1$ or —$SO_2NR_2R_3$, and most preferably —$SO_2$—$R_1$.

$R_1$, $R_2$ and $R_3$ in Compounds G to L each independently has the same meaning as $R_1$, $R_2$ and $R_3$ in Compounds A to F described above, and preferred examples thereof are also same as those described for $R_1$, $R_2$ and $R_3$ in Compounds A to F.

a in Compounds G to L of formula (VII) represents a number of the substituent represented by X' and is an integer of 1 to 2, particularly preferably 1.

Specific examples of the phthalic acid derivative used as the raw material according to the invention are set forth below.

Specific examples of the substituted phthalonitrile (Compound A) include 4-sulfophthalonitrile, 4-(3-sulfopropylsulfonyl)phthalonitrile and 4,5-bis(3-sulfopropylsulfonyl)phthalonitrile.

Specific examples of the substituted diiminoisoindoline (Compound B) include 3-amino-1-imino-1H-isoindole-5-sulfonic acid.

Specific examples of the substituted phthalic acid diamide (Compound C) include 4-(4-sulfobutylsulfonyl)phthalic acid diamide.

Specific examples of the substituted phthalimide (Compound D) include 4-(3-carboxypropylsulfonyl)phthalimide.

Specific examples of the substituted phthalic acid and a salt thereof (Compound E) include trimellitic acid, 4-sulfophthalic acid and 4-(3-sulfopropylsulfonyl)phthalic acid.

Specific examples of the substituted phthalic anhydride (Compound F) include trimellitic anhydride and 4-sulfophthalic anhydride.

Now, the metal derivative (metal derivative represented by formula (VI)) is described in detail below.

$$M\text{-}(Z)_d \quad \text{Formula (VI)}$$

In formula (VI), M represents a hydrogen atom or a metal atom or an oxide, hydroxide or halide thereof.

Examples of the metal atom include Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb and Bi.

Examples of the oxide include VO and GeO.

Examples of the hydroxide include $Si(OH)_2$, $Cr(OH)_2$ and $Sn(OH)_2$.

Examples of the halide include AlCl, $SiCl_2$, VCl, $VCl_2$, VOCl, FeCl, GaCl and ZrCl.

M is preferably Cu, Ni, Zn or Al, and most preferably Cu. Z represents a halogen atom, acetate anion, acetylacetonate or a monovalent or divalent ligand, for example, oxygen. d represents an integer of 1 to 4.

In formula (VI), Z represents a halogen atom, acetate anion, acetylacetonate or a monovalent or divalent ligand, for example, oxygen d represents an integer of 1 to 4.

Examples of the metal derivative (metal derivative represented by formula (VI)) include a halide, carboxylic acid derivative, sulfate, nitrate, carbonyl compound, oxide and complex of Al, Si, Ti, V, Mn, Fe, Co, Ni, Cu, Zn, Ge, Ru, Rh, Pd, In, Sn, Pt and Pb. Specific examples thereof include copper chloride, copper bromide, copper iodide, nickel chloride, nickel bromide, nickel acetate, cobalt chloride, cobalt bromide, cobalt acetate, iron chloride, zinc chloride, zinc bromide, zinc iodide, zinc acetate, vanadium chloride, vanadium oxytrichloride, palladium chloride, palladium acetate, aluminum chloride, manganese chloride, manganese acetate, manganese acetylacetone, manganese chloride, lead chloride, lead acetate, indium chloride, titanium chloride and tin chloride.

[Dye Mixture Represented by Formulae (I) and (II)]

Now, the dye mixture represented by formulae (I) and (II) is described in detail below. The dye mixture represented by formulae (I) and (II) according to the invention includes the dye mixture and salt thereof and the dye mixture and hydrate thereof The salt or hydrate may be used individually or as a mixture in the dye mixture.

In formula (I), M has the same meaning as M in formula (VI), and preferred examples thereof are also same as those described for M in formula (VI).

In formula (I), $X_1$, $X_2$, $X_3$ and $X_4$ each independently represents a substituent selected from —SO—$R_1$, —$SO_2$—$R_1$, —$SO_2NR_2R_3$, —$CONR_2R_3$, —$CO_2$—$R_1$ and —CO—$R_1$, and at least one of the substituent exists on each of four benzene rings (benzene rings indicated by A, B, C and D in formula (II)) of the phthalocyanine nucleus. The dye mixture of the invention is a dye mixture comprising dyes having plural different substituents. In the dyes, a center metal of the phthalocyanine nucleus is the same.

The substituent is preferably selected from —SO—$R_1$, —$SO_2$—$R_1$ and —$SO_2NR_2R_3$. A group of —$SO_2$—$R_1$ and —$SO_2$—$R_2$ and a group of —SO—$R_1$ and —$SO_2NR_2R_3$ are preferred and the group of —$SO_2$—$R_1$ and —$SO_2$—$R_2$ is particularly preferred.

However, $X_1$, $X_2$, $X_3$ and $X_4$ are not the same simultaneously. The sameness (that is, a number of the same groups in $X_1$, $X_2$, $X_3$ and $X_4$) can appropriately changed depending on the solubility, association property or the like.

Further, at least one of $X_1$, $X_2$, $X_3$ and $X_4$ is the substituent having two or more carbon atoms (preferably 50 or less carbon atoms, more preferably 30 or less carbon atoms) and a total number of carbon atoms included in the substituents represented by $X_1$, $X_2$, $X_3$ and $X_4$ is 8 or more (preferably 200 or less carbon atoms, more preferably 120 or less carbon atoms). Moreover, an ionic hydrophilic group is not included.

In formula (I), $R_1$, $R_2$ and $R_3$ each independently has the same meaning as $R_1$, $R_2$ and $R_3$ in Compounds A to F of formula (V), and preferred examples thereof are also same as those described for $R_1$, $R_2$ and $R_3$ in Compounds A to F of formula (V).

In formula (I), k represents an integer of $0<k<8$, l represents an integer of $0<l<8$, m represents an integer of $0 \leq m<8$ and n represents an integer of $0 \leq n<8$.

However, k, l, m and n satisfy $4 \leq k+l+m+n \leq 8$

It is preferred that k represents an integer of $0<k<8$, l represents an integer of $0<l<8$, in represents an integer of $0 \leq m<8$ and n represents 0. More preferably, k represents an integer of $0<k<8$, l represents an integer of $0<l<8$ and m and n each represents 0. Most preferably, k represents an integer of $0<k<4$, l represents an integer of $0<l<4$ and m and n each represents 0, provided that k and l each represents an integer satisfying a relation of $k+l=4$.

In formula (II), $Y_1$, $Y_2$, $Y_3$, $Y_4$, $Y_5$, $Y_6$, $Y_7$ and $Y_8$, each independently has the same meaning as Y in Compounds A to F of formula (V), and preferred examples thereof are also same as those described for $Y_1$, $Y_2$, $Y_3$, $Y_4$, $Y_5$, $Y_6$, $Y_7$ and $Y_8$ in Compounds A to F of formula (V).

Of the dye mixtures of the invention, a copper phthalocyanine dye mixture prepared from the most preferable phthalic acid derivative described above, wherein a is 1, the soluble group is substituted on the β-position (4-position or 5-position in Compounds A, C, D and E and 5-position or 6-position in Compounds B and F), Y is a hydrogen atom and M is Cu is represented by formula (VIII) shown below, when different two kinds of phthalic acid derivatives are used for the preparation.

Cu-Pc-$(X_1)_k(X_2)_l$ $(k+l=4)$  Formula (VIII)

When different three kinds of phthalic acid derivatives are used for the preparation, the dye mixture is represented by formula (IX) shown below.

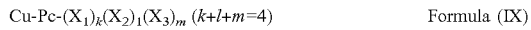

Cu-Pc-$(X_1)_k(X_2)_l(X_3)_m$ $(k+l+m=4)$  Formula (IX)

When different four kinds of phthalic acid derivatives are used for the preparation, the dye mixture is represented by formula (X) shown below.

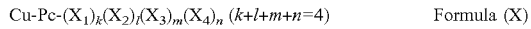

Cu-Pc-$(X_1)_k(X_2)_l(X_3)_m(X_4)_n$ $(k+l+m+n=4)$  Formula (X)

In formulae (VIII) to (X), Cu-Pc represents a copper phthalocyanine skeleton, k, l, m and n each represents a feeding ratio (equivalent: a equivalent ratio at the reaction) of the phthalic acid derivatives and a number of 0 or larger, provided that the total of k, l, m and n is 4, and $X_1$, $X_2$, $X_3$ and $X_4$ each represents a substituent different from each other substituted on the β-position.

A preferable feeding ratio of two or more phthalic acid derivatives (Compounds G to L) having different soluble groups or precursors thereof used in the production of copper phthalocyanine dye mixture represented by any one formulae (VIII) to (X) is described in the case of using two kinds of phthalic acid derivatives to prepare the phthalocyanine dye mixture by way of illustration.

When equivalent of one phthalic acid derivative is k and equivalent of the other phthalic acid derivative is l, k and l each preferably represents an actual number satisfying $0<k<4$, $0<l<4$ and $k+l=4$.

More preferably, k and l each represents an actual number satisfying $0<k \leq 2$, $0<l \leq 2$ and $k+l=4$, and particularly preferably, k and l each represents an actual number satisfying $0<k \leq 1$, $0<l<3$ and $k+l=4$.

In the case of using three kinds of phthalic acid derivatives to prepare the phthalocyanine dye mixture, when equivalent of first phthalic acid derivative is k, equivalent of second phthalic acid derivative is l and equivalent of third phthalic acid derivative is m, k, l and m each represents an actual number satisfying $0<k<4$, $0<l<4$, $0<m<4$ and $k+l+m=4$.

In the case of using four kinds of phthalic acid derivatives to prepare the phthalocyanine dye mixture, when equivalent of first phthalic acid derivative is k, equivalent of second phthalic acid derivative is l, equivalent of third phthalic acid derivative is m and equivalent of forth phthalic acid derivative is n, k, l, m and n each represents an actual number satisfying $0<k<4$, $0<l<4$, $0<m<4$, $0<n<4$ and $k+l+m+n=4$.

With respect to the kind of phthalic acid derivatives (Compounds G to L) having different soluble groups or precursors thereof used in the production of copper phthalocyanine dye mixture represented by any one of formulae (VIII) to (X), it is preferable to use two to four kinds of phthalic acid derivatives (Compounds G to L) having different soluble groups or precursors thereof, more preferable to use two to three kinds of phthalic acid derivatives (Compounds G to L) having different soluble groups or precursors thereof, and particularly preferable to use two kinds of phthalic acid derivatives (Compounds G to L) having different soluble groups or precursors thereof.

In summary, as for the dye mixture represented by formulae (I), (II) and (III), preferable combinations are described below.

(A) $X_1$, $X_2$, $X_3$ and $X_4$ each independently represents preferably —SO—$R_1$, —$SO_2$—$R_1$, —$SO_2NR_2R_3$, —$CONR_2R_3$, —$CO_2$—$R_1$ or —CO—$R_1$, more preferably —$SO_2$—$R_1$, —$SO_2NR_2R_3$, —$CONR_2R_3$, —$CO_2$—$R_1$ or —CO—$R_1$, particularly preferably —$SO_2$—$R_1$ or —$SO_2NR_2R_3$, and most preferably —$SO_2$—$R_1$.

(B) $R_1$ represents preferably a substituted or unsubstituted alkyl group, a substituted or unsubstituted aryl group or a substituted or unsubstituted heterocyclic group, more preferably a substituted alkyl group, a substituted aryl group or a substituted heterocyclic group, and most preferably a substituted alkyl group having a hydroxy group as the substituent.

(C) $R_2$ represents preferably a hydrogen atom, a substituted or unsubstituted alkyl group, a substituted or unsubstituted aryl group or a substituted or unsubstituted heterocyclic group, more preferably a hydrogen atom, a substituted alkyl group, a substituted aryl group or a substituted heterocyclic group, and most preferably a hydrogen atom.

(D) $R_3$ represents preferably a substituted or unsubstituted alkyl group, a substituted or unsubstituted aryl group or a substituted or unsubstituted heterocyclic group, more preferably a substituted alkyl group, a substituted aryl group or a substituted heterocyclic group, and most preferably a substituted alkyl group having a hydroxy group as the substituent.

(E) In the phthalic acid derivative, which is a raw material of the dye mixture of the invention, a represents a number of the substituent represented by X' and is an integer of 1 to 4. a is preferably 1 or 2 and more preferably 1. When a is 1 or 2, it is preferred that the positions substituted with X' are 4-position and/or 5-position in Compounds A, C, D and E and 5-position and/or 6-position in Compounds B and F, respectively. The position is indicated by an asterisk (*) in Formula (V), and called β-position.

(F) $Y_1$, $Y_2$, $Y_3$, $Y_4$, $Y_5$, $Y_6$, $Y_7$ and $Y_8$ each independently represents preferably a hydrogen atom or a halogen atom, and most preferably a hydrogen atom.

(G) In the phthalic acid derivative, which is a raw material of the dye mixture of the invention, b represents a number of the substituent represented by Y and is an integer of 1 to 4b is preferably 3 or 2 and more preferably 3.

(H) M is preferably Cu, Ni, Zn, Al or the like, and most preferably Cu.

(I) An average molecular weight (having a molecular weight distribution determined based on a feeding ratio of the phthalic acid derivatives) of the dye mixture of the invention is preferably in a range of 750 to 2,500, more preferably in a range of 995 to 2,500, still more preferably in a range of 995 to 2,000, and most preferably in a range of 995 to 1,800.

(J) The dye represented by formula (I) is preferably a dye represented by formula (IV). The phthalocyanine nucleus represented by formula (II) is preferably a phthalocyanine nucleus represented by formula (III).

In the dye mixture represented by formula (I), it is preferable to include at least one substituent having two or more carbon atoms (preferably 50 or less carbon atoms, more preferably 30 or less carbon atoms) per phthalocyanine nucleus unit, particularly preferable to have a total number of carbon atoms included in the substituents of 8 or more (preferably 200 or less carbon atoms, more preferably 120 or less carbon atoms) per phthalocyanine nucleus unit, and most preferable to have a total number of carbon atoms included in the substituents of 10 or more (preferably 200 or less carbon atoms, more, preferably 120 or less carbon atoms) per phthalocyanine nucleus unit. However, the ionic hydrophilic group is not included.

Since the dye mixture represented by formula (I) includes at least one substituent having two or more carbon atoms per phthalocyanine nucleus unit, solubility or dispersibility in an oily medium is preferable.

With respect to a preferred combination of the substituents in the dye represented by formula (I) according to the invention, a compound wherein at least one of various substituents is the preferred group described above is preferable, a compound wherein a larger number of various substituents are the preferred groups described above is more preferable, and a compound wherein all of various substituents are the preferred groups described above is most preferable.

Of the dye mixtures represented by formula (I) according to the invention, a dye mixture represented by formula (IV) shown below is more preferred.

The dye mixture represented by formula (IV) according to the invention includes dye mixture and salt thereof and dye mixture and hydrate thereof The salt or hydrate may be used individually or as a mixture in the dye mixture.

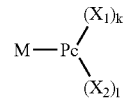

Formula (IV)

In formula (IV), M, $X_1$ and $X_2$ each independently has the same meaning as M, $X_1$ and $X_2$ in formula (I), and preferred examples thereof are also same as those described for M, $X_1$ and $X_2$ in formula (I).

In formula (IV), k represents an integer of $0<k<8$ and l represents an integer of $0<l<8$.

However, k and l satisfy $4 \leq k+l<8$.

Further, k represents an integer of $0<k<8$ and l represents an integer of $0<l<8$. Most preferably, k represents an integer of $0<k<4$ and l represents an integer of $0<l<4$, provided that k and l each represents an integer satisfying a relation of $k+l=4$.

In summary, as for the dye represented by formulae (IV), (II) and (III), preferable combinations are described below. Specifically, $X_1$ and $X_2$ each independently represents preferably —SO—$R_1$, —SO$_2$—$R_1$, —SO$_2$NR$_2$R$_3$, —CONR$_2$R$_3$, —CO$_2$—$R_1$ or —CO—$R_1$, more perferably —SO$_2$—$R_1$, —SO$_2$NR$_2$R$_3$, —CONR$_2$R$_3$, —CO$_2$—$R_1$ or —CO—$R_1$, particularly preferably —SO$_2$—$R_1$ or —SO$_2$NR$_2$R$_3$, and most preferably —SO$_2$—$R_1$.

$R_1$ represents preferably a substituted or unsubstituted alkyl group, a substituted or unsubstituted aryl group or a substituted or unsubstituted heterocyclic group, more preferably a substituted alkyl group, a substituted aryl group or a substituted heterocyclic group, and most preferably a substituted alkyl group having a hydroxy group as the substituent.

$R_2$ represents preferably a hydrogen atom, a substituted or unsubstituted alkyl group, a substituted or unsubstituted aryl group or a substituted or unsubstituted heterocyclic group, more preferably a hydrogen atom, a substituted alkyl group, a substituted aryl group or a substituted heterocyclic group, and most preferably a hydrogen atom.

$R_3$ represents preferably a substituted or unsubstituted alkyl group, a substituted or unsubstituted aryl group or a substituted or unsubstituted heterocyclic group, more preferably a substituted alkyl group, a substituted aryl group or a substituted heterocyclic group, and most preferably a substituted alkyl group having a hydroxy group as the substituent.

In the phthalic acid derivative, which is a raw material of the dye mixture of the invention, a represents a number of the substituent represented by X' and is an integer of 1 to 4.

a is preferably 1 or 2 and more preferably 1. When a is 1 or 2, it is preferred that the positions substituted with X' are 4-position and/or 5-position in Compounds A, C, D and E and 5-position and/or 6-position in Compounds B and F, respectively. The position is indicated by an asterisk (*) in Formula (V), and called β-position.

$Y_1$, $Y_2$, $Y_3$, $Y_4$, $Y_5$, $Y_6$, $Y_7$ and $Y_8$ each independently represents preferably a hydrogen atom or a halogen atom, and most preferably a hydrogen atom.

In the phthalic acid derivative, which is a raw material of the dye mixture of the invention, b represents a number of the substituent represented by Y and is an integer of 1 to 4. b is preferably 3 or 2 and more preferably 3.

M is preferably Cu, Ni, Zn, Al or the like, and most preferably Cu.

An average molecular weight (having a molecular weight distribution determined based on a feeding ratio of the phthalic acid derivatives) of the dye mixture of the invention is preferably in a range of 750 to 2,500, more preferably in a range of 995 to 2,500, still more preferably in a range of 995 to 2,000, and most preferably in a range of 995 to 1,800.

In the dye mixture represented by formula (IV), it is preferable to include at least one substituent having two or more carbon atoms (preferably 50 or less carbon atoms, more preferably 30 or less carbon atoms) per phthalocyanine nucleus unit, particularly preferable to have a total number of carbon atoms included in the substituents of 8 or more (preferably 200 or less carbon atoms, more preferably 120 or less carbon atoms) per phthalocyanine nucleus unit, and most preferable to have a total number of carbon atoms included in the substituents of 10 or more (preferably 200 or less carbon atoms, more preferably 120 or less carbon atoms) per phthalocyanine nucleus unit. However, the ionic hydrophilic group is not included.

Since the dye mixture represented by formula (IV) includes at least one substituent having two or more carbon atoms per phthalocyanine nucleus unit, solubility or dispersibility in an oily medium is preferable.

With respect to a preferred combination of the substituents in the dye represented by formula (IV) according to the invention, a compound wherein at least one of various substituents is the preferred group described above is preferable, a compound wherein a larger number of various substituents are the preferred groups described above is more preferable, and a compound wherein all of various substituents are the preferred groups described above is most preferable.

Correlation between the structure and the performance of the phthalocyanine compound according to the invention will be described below under (1) oxidation potential of the phthalocyanine compound used in ink for image formation and (2) structural characteristic of the phthalocyanine compound.

Oxidation Potential of the Phthalocyanine Compound:

By selecting a substituent having a large electron-withdrawing property as the soluble group represented by X' or the substituent represented by Y in the production method of phthalocyanine dye mixture according to the invention, an oxidation potential of the resulting phthalocyanine dye can be adjusted higher (more electropositive) to make it possible that reactivity of the dye with active gas (for example, oxidizing gas, e.g. ozone or singlet oxygen) is more restrained, whereby the dye having resistance to the active gas can be obtained.

As a measure for indicating the electron-withdrawing property, a Hammett's substituent constant σp value (hereinafter simply referred to as a "σp value") can be used. The σp value of the soluble group is preferably 0.40 or more, more preferably 0.45 or more, and still more preferably 0.50 or more.

In the case where the phthalocyanine compound obtained has plural substituents (including the soluble group) other than a hydrogen atom on the phthalocyanine nucleus (benzene ring structure) thereof, the total of σp value of the substituents (including the soluble group) is preferably 0.50 or more, more preferably 0.55 or more, and still more preferably 0.60 or more.

The Hammett's substituent constant σp value is briefly described here. The Hammett's rule is an empirical rule advocated by L. P. Hammett in 1935 in order to quantitatively discuss the effect of substituent on the reaction or equilibrium of benzene derivatives and its propriety is widely admitted at present. The substituent constant determined by the Hammett's rule includes a σp value and a σm value and these values can be found in a large number of ordinary publications and these are described in detail, for example, in J. A. Dean (compiler), Lange's Handbook of Chemistry, 12th Edition, McGraw-Hill (1979), and Kagaku no Ryoiki (Chemistry Region), special number, No. 122, pp. 96-103, Nankodo Co., Ltd. (1979).

Thus, by introducing a substituent having a large electron-withdrawing property as the soluble group, a phthalocyanine dye having an electropositive oxidation potential can be obtained. The oxidation potential of phthalocyanine dye is preferably more electropositive than 1.0 V (vs SCE). A more electropositive oxidation potential is more preferable, and the oxidation potential of phthalocyanine dye is more preferably more electropositive than 1.1 V (vs SCE) and most preferably more electropositive than 1.15 V (vs SCE).

The oxidation potential value (Eox) can be easily measured by person skilled in the art. The method therefor is described, for example, in P. Delahay, New Instrumental Methods in Electrochemistry, Interscience Publishers (1954), A. J. Bard et al., Electrochemical Methods, John Wiley & Sons (1980), and Akira Fujishima et al., Denkikagaku Sokuteiho (Electrochemical Measuring Method), Gihodo Shuppan Co., Ltd. (1984).

A supporting electrolyte and solvent for use in the measurement of the invention can be appropriately selected depending on an oxidation potential and solubility of a test sample. The supporting electrolyte and solvent, which can be used, are described in Akira Fujishima et al., Denkikagaku Sokuteiho (Electrochemical Measuring Method), pp 101-118, Gihodo Shuppan Co., Ltd. (1984).

According to the invention, a test sample is dissolved at a concentration of $1 \times 10^{-2}$ to $1 \times 10^{-6}$ mol/liter in dimethylformamide containing as a supporting electrolyte, tetrapropylammonium perchlorate and an oxidation potential is measured as a value to SCE (saturated calomel electrode) for a reference electrode by a cyclic voltammetry or the like using a carbon (GC) electrode as a working electrode and a platinum electrode as a counter electrode. Although the value sometimes deviates on the order of tens of millivolt due to the effect of liquid junction potential, liquid resistance of sample solution, or the like, the reproducibility of potential can be guaranteed by using a standard sample (for example, hydroquinone).

The phthalocyanine dye mixture of the invention exhibits the oxidation potential of more electropositive than 1.0 V (vs SCE), and it has been found that to have this physical value is very important for the improvement in fastness of image formed.

Structural Characteristic of the Phthalocyanine Compound:

Specifically, there is an extremely important structural characteristic (to control the oxidation potential of phthalocyanine dye mixture) as means for improving preservability (light fastness, ozone resistance, or the like) of image formed, which is one of the objects of the invention.

The phthalocyanine dye mixture represented by formulae (I) to (IV) corresponds to a β-position substituted type compound (phthalocyanine compound having specific substituents on 2-position and/or 3-position, 6-position and/or 7-position, 10-position and/or 11-position and 14-position and/or 15-position) described in formula (XI) shown below.

The invention effectively utilizes an aggregate of water-soluble dye mixture originated from the β-position substituted type compound (phthalocyanine compound having specific substituents on 2-position and/or 3-position, 6-position and/or 7-position, 10-position and/or 11-position and 14-position and/or 15-position).

The aggregate of phthalocyanine dye means an aggregate formed from two or more phthalocyanine molecules.

According to the invention, it has been found that stabilities to light, heat and oxidizing gas (particularly ozone gas) are extremely improved by utilizing the aggregate of phthalocyanine dye in comparison with a phthalocyanine dye under monomolecular dispersion condition.

It has also been found that by the formation of aggregate, a spectral characteristic (cyan hue: excellent absorption characteristic as a cyan dye for an image-forming material) of image formed and that paper dependency based on difference in a recording material (for example, plain paper or inkjet paper) is very small (good hue (color reproducibility) and improvement in water resistance: resulted from, for example, a small difference between a existing state and a mordanting state due to the firm aggregate).

Whether an aggregate of dye is formed or not is easily determined from shifting of absorption maximum (λmax) in an absorption spectrum as described, for example, in J. D. Wright, Bunshi Kessho, translated by Taro Eguchi (Kagaku-Dojin Publishing Co., Ltd.). Ordinarily, the aggregate is divided into two classes of a J-aggregate shifting to a longer wavelength side and an H-aggregate shifting to a shorter wavelength side. In the invention, the water-soluble phthalocyanine aggregate shifting an absorption maximum to a shorter wavelength side is utilized.

Thus, it has been found that the structural characteristic of water-soluble phthalocyanine dye according to the invention, that is, a structure introduced a specific number of specific substituent (—SO—$R_1$ and/or —$SO_2$—$R_1$ and/or —$SO_2NR_2R_3$ described above) into a specific position (β-position) of a phthalocyanine skeleton, promotes the association state and forms the most preferable structure in view of the fastness and hue of image formed.

The effect (promotion of the association state) described above achieves (1) the improvement in preservability of image formed, which is one of the objects of the invention, and (2) the extremely preferable spectral characteristic (cyan hue: excellent absorption characteristic as a cyan dye for an image-forming material) of image formed, which is another object of the invention, and (3) reduces the paper dependency based on difference in a recording material (for example, plain paper or inkjet paper). Thus, the above-described structural characteristic (to control promotion of the association property of phthalocyanine compound) is extremely important for satisfying (1) to (3).

The term "ozone gas resistance" as used herein representatively means resistance to ozone gas and also includes resistance to oxidizing atmosphere other than the ozone gas.

Specifically, the phthalocyanine compound represented by formula (I) according to the invention is characterized by having a strong resistance to the oxidizing gas present in ordinary environment, for example, nitrogen oxides largely contained in car exhaust emission, sulfur oxides largely contained in emission from heat power stations and factories, ozone gas and oxygen-nitrogen or oxygen-hydrogen radical-rich photochemical smog generated upon a photochemically radical chain reaction of these oxides in sunlight, or hydrogen peroxide radicals occurred from places using specific chemicals, for example, hair salons. Therefore, in the case where oxidizing deterioration of image governs image life, for example, outdoor advertising or information in railroad facilities, the oxidizing atmosphere resistance, specifically, a so-called ozone gas resistance, can be improved by using the phthalocyanine compound according to the invention as an image-forming material.

Synthesis conditions in the production method of the dye mixture of the invention using the phthalic acid derivative and metal derivative are described in detail below.

A ratio of amounts of the phthalic acid derivative and metal derivative used is preferably 3:1 to 6:1 in terms of a molar ratio of metal derivative:phthalic:acid derivative.

A reaction of the phthalic acid derivative and metal derivative is ordinarily carried out in the presence of a solvent. As the solvent, an organic solvent having a boiling point of 80° C. or higher, preferably 130° C. or higher is used. Examples of the solvent include n-amylalcohol, n-hexylalcohol, cyclohexanol, 2-methyl-1-pentanol, 1-heptanol, 2-heptanol, 1-octanol, 2-ethylhexanol, benzyl alcohol, ethylene glycol, diethylene glycol, propylene glycol, ethoxyethanol, propoxyethanol, butoxyethanol, dimethylaminoethanol, diethylaminoethanol, trichlorobenzene, chloronaphthalene, sulfolane, nitrobenzene, quinoline and urea. An amount of the solvent used is preferably from 1 to 100 times by weight, more preferably from 5 to 20 times by weight, based on the phthalic acid derivative.

The reaction of the phthalic acid derivative and metal derivative may be carried out in the presence of a catalyst. Examples of the catalyst include 1,8-diazabicyclo[5.4.0]-7-undecene (DBU) and ammonium molybdate. An amount of the catalyst used is preferably from 0.1 to 10 times by mole, more preferably from 0.5 to 2 times by mole, based on the phthalic acid derivative.

The reaction of the phthalic acid derivative and metal derivative is preferably conducted in a reaction temperature range of 80 to 300° C., more preferably in a reaction temperature range of 100 to 250° C., and still more preferably in a reaction temperature range of 130 to 230° C. When the reaction temperature is less than 80° C., a reaction rate may become extremely slow in some cases. On the other hand, when it exceeds 300° C., there is a possibility of decomposition of the phthalocyanine dye obtained.

The reaction time is preferably in a rage of 2 to 20 hours, more preferably in a rage of 5 to 15 hours, and still more preferably in a rage of 5 to 10 hours. When the reaction time is less than 2 hours, a large amount of the unreacted raw material may exist in some cases. On the other hand, when it exceeds 20 hours, there is a possibility of decomposition of the phthalocyanine dye obtained.

In the production method of the phthalocyanine dye mixture of the invention, a product (phthalocyanine dye) obtained by the reaction is treated according to an aftertreatment method for a conventional organic synthesis reaction, and then can be used after purification or without purification.

More specifically, the product separated from the reaction system can be used without purification or after conducting operation of purification, for example, recrystallization or column chromatography method, individually or in combination.

Further, after the completion of the reaction, the reaction solvent is distilled off or without distillation and the reaction product is poured into water or ice, and then product separated with or without neutralization can be used without purification or after conducting operation of purification, for example, recrystallization or column chromatography method, individually or in combination.

Moreover, after the completion of the reaction, the reaction solvent is distilled off or without distillation and the reaction product is poured into water or ice. After neutralization or without neutralization, the extract with an organic solvent/aqueous solution can be used without purification or after conducting operation of purification, for example, recrystallization or column chromatography method, individually or in combination.

It is ordinarily known that various phthalocyanine compounds are used in an inkjet recording ink composition. The phthalocyanine compound represented by formula (XI) shown below may inevitably include isomers different in substitution position (defined as $R_1$: 1-position to $R_{16}$: 16-position, here) of a substituent $R_n$ (n is 1 to 16) at the synthesis thereof in some times. In many cases, however, these substitution position isomers are regarded as the same derivative without differentiating from each other. Further, when the substituent for R includes isomers, the isomers are not distinguished and regarded as the same phthalocyanine compound in many cases.

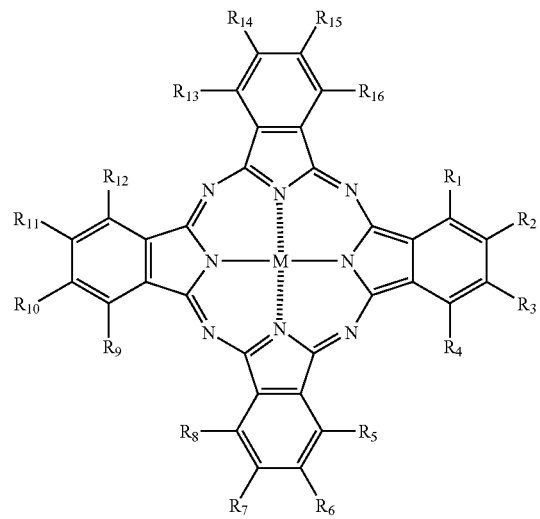

Formula (XI)

The case where structure is different in the phthalocyanine compound defined in the present specification is described with reference to formula (XI). The case is any one of a case where a species of constituting atoms of the substituent $R_n$ (n is 1 to 16) is different, a case where a number of the substituent $R_n$ is different and a case where a position of the substituent $R_n$ is different.

Derivatives of the phthalocyanine compound represented by formula (XI) having different structures (particularly, substitution position) in the invention are defined by classifying into the following three types.

β-Position Substitution Type:

The phthalocyanine compound having specific substituents on the 2-position and/or 3-position, the 6-position and/or 7-position, the 10-position and/or 11-position, and the 14-position and/or 15-position.

α-Position Substitution Type:

The phthalocyanine compound having specific substituents on the 1-position and/or 4-position, the 5-position and/or 8-position, the 9-position and/or 12-position, and the 13-position and/or 16-position.

α,β-Position Mixed Substitution Type:

The phthalocyanine compound having specific substitutions on the 1-position to 16-position without any regularity.

In the case of describing the phthalocyanine derivatives having different structures (particularly, substitution position) in the present specification, the above-described (1) β-position substitution type, (2) α-position substitution type and (3) α,β-position mixed substitution type are used.

The thus-obtained phthalocyanine derivative (for example, a case of k=l=m=n=1) is ordinarily a mixture of compounds represented by formulae (a)-1 to (a)-4 shown below, which are isomers with respect to the introduction position of each substituent $X_1$, $X_2$, $X_3$ or $X_4$ (the introduction position is in common the β-position).

Formula (a)-1

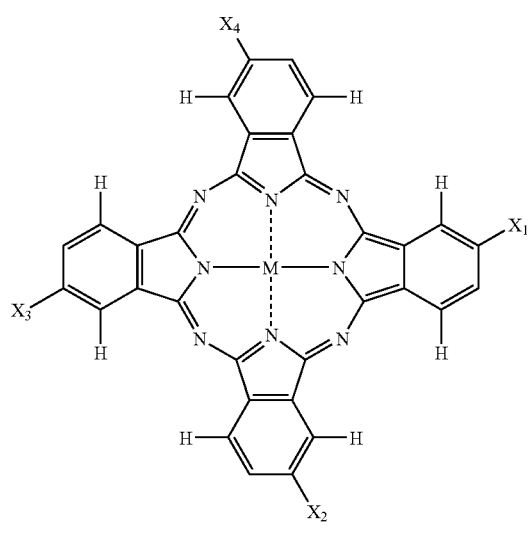

Formula (a)-2

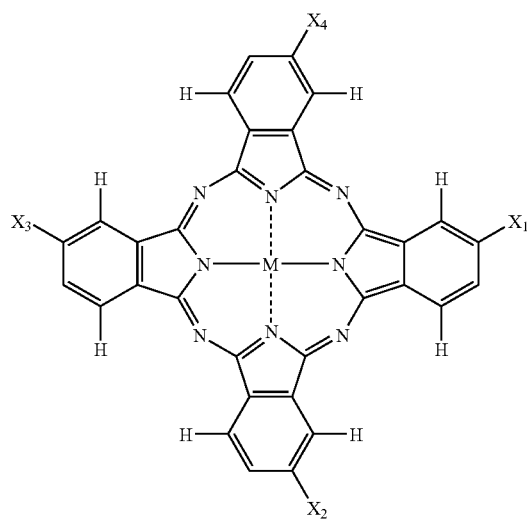

Formula (a)-3

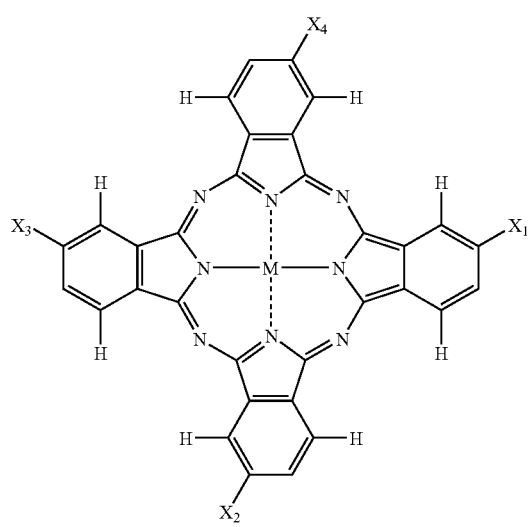

-continued

Formula (a)-4

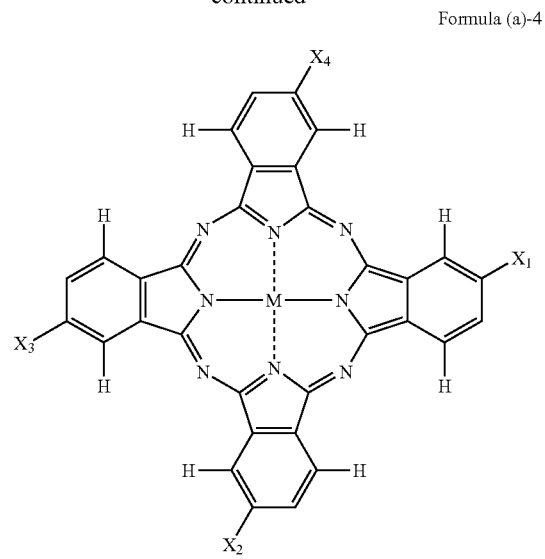

Specifically, the compounds represented by formula (a)-1 to (a)-4 are those of the β-position substitution type (phthalocyanine compounds having specific substituents on the 2-position and/or 3-position, the 6-position and/or 7-position, the 10-position and/or 11-position, and the 14-position and/or 15-position), and are completely different in the structures (different in the introduction positions of the specific substituents) from compounds of the α-position substitution type (phthalocyanine compounds having specific substituents on the 1-position and/or 4-position, the 5-position and/or 8-position, the 9-position and/or 12-position, and the 13-position and/or 16-position) and compounds of the α,β-position mixed substitution type (phthalocyanine compounds having specific substitutions on the 1-position to 16-position without any regularity). This is the extremely important structural characteristic as a means for achieving the objects of the invention.

Although the reason for achieving the objects of the invention is not clear in detail, there is a tendency that the derivative having the soluble group introduced only on the β-position is predominantly excellent in the hue, light fastness, ozone gas resistance and the like in comparison with other derivatives.

More specifically, it is believed that the phthalocyanine compound according to the invention, which has (1) preferable spectral absorption characteristic (promotion of the association state of the phthalocyanine compound due to the introduction of the specific soluble group into the β-position), (2) high image fastness (for example, color fading based on oxidation reaction of the phthalocyanine compound with ozone gas that is an electrophilic reagent is prevented), (3) high solubility in ink composition, and (4) ability of providing preferable time-lapse stability of ink, is completed by selectively introducing the specific number of the specific soluble groups into the specific substitution positions (β-positions), that is, by selectively introducing the desired number of the specific soluble group having a high oxidation potential and capable of forming a firm aggregate of the phthalocyanine compound of complete β-position substitution type.

In view of the synthesis, it is preferred to select a substituent having a large electron-withdrawing property as the soluble group X and a hydrogen atom as Y.

The effects of improvements in hue, light fastness, ozone gas resistance and the like and impartment of characteristics requested for color composition (ink) cannot be expected at all from the conventional technologies described above.

Specific examples (Dyes 1 to 155) of the dye mixture of the invention are set forth below, but the present invention should not be construed as being limited thereto.

In Tables 1 to 3 below, formula (XII) represents a (k+l) valent phthalocyanine nucleus (introduction positions of the substituents R are β-positions as defined in the invention). R represents $R_1$ and/or $R_2$ t represents a number of $1 < t \leq 2$ k represents a number of $0 < k < 8$ and l represents a number of $0 < l < 8$, provided that k and l satisfy $4 \leq k+l \leq 8$.

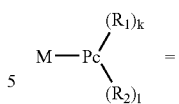

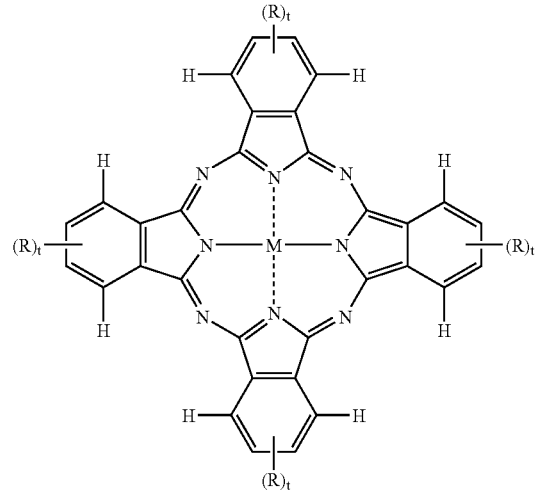

Formula (XII)

TABLE 1

In the following table, the introduction positions of the substituents ($R_1$) and ($R_2$) in each compound are exchangeable with each other in the β-position substitution type phthalocyanine dye (indicating the isomers represented by formulae (a)-1 to (a)-4). The values of k and l each represents a mean value of a mixing ratio based on a feeding molar ratio (eq./eq.) of the phthalonitrile derivatives used in the synthesis of the phthalocyanine derivative.

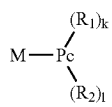

| Compound No. | M | $R_1$ | k | $R_2$ | l |
|---|---|---|---|---|---|
| 101 | Cu | —SO$_2$—(CH$_2$)$_3$SO$_2$NH(CH$_2$)$_3$OCH(CH$_3$)$_2$ | 3 | —SO$_2$—(CH$_2$)$_3$SO$_2$NHCH$_2$CH(OH)CH$_3$ | 1 |
| 102 | Cu | —SO$_2$—(CH$_2$)$_3$SO$_2$NH(CH$_2$)$_3$OCH(CH$_3$)$_2$ | 2 | —SO$_2$—(CH$_2$)$_3$SO$_2$NHCH$_2$CH(OH)CH$_3$ | 2 |
| 103 | Cu | —SO$_2$—(CH$_2$)$_3$CO$_2$CH(CH$_3$)CH$_2$OCH$_3$ | 3 | —SO$_2$—(CH$_2$)$_3$SO$_2$NHCH$_2$CH(OH)CH$_3$ | 1 |
| 104 | Cu | —SO$_2$—(CH$_2$)$_3$SO$_2$NH(CH$_2$)$_3$OCH(CH$_3$)$_2$ | 2 | —SO$_2$—(CH$_2$)$_3$CO$_2$CH(CH$_3$)CH$_2$OCH$_3$ | 2 |
| 105 | Cu | —SO$_2$—(CH$_2$)$_3$SO$_2$NH(CH$_2$)$_3$OCH(CH$_3$)$_2$ | 3 | —SO$_2$—(CH$_2$)$_3$SO$_2$NHCH$_2$CH(OH)CH$_2$OH | 1 |

TABLE 2

In the following table, the introduction positions of the substituents ($R_1$) and ($R_2$) in each compound are exchangeable with each other in the β-position substitution type phthalocyanine dye (indicating the isomers represented by formulae (a)-1 to (a)-4). The values of k and l each represents a mean value of a mixing ratio based on a feeding molar ratio (eq./eq.) of the phthalonitrile derivatives used in the synthesis of the phthalocyanine derivative.

$$M-Pc\begin{matrix}(R_1)_k\\(R_2)_l\end{matrix}$$

| Compound No. | M | $R_1$ | k | $R_2$ | l |
|---|---|---|---|---|---|
| 106 | Cu | —SO$_2$—(CH$_2$)$_3$SO$_2$NH(CH$_2$)$_3$OCH(CH$_3$)$_2$ | 3 | —SO$_2$—(CH$_2$)$_3$SO$_2$NH(CH$_2$)$_3$N(C$_2$H$_4$OH)$_2$ | 1 |
| 107 | Cu | —SO$_2$—(CH$_2$)$_3$CO$_2$CH(CH$_3$)CH$_2$OCH$_3$ | 2.5 | —SO$_2$—(CH$_2$)$_3$SO$_2$NHC$_2$H$_4$OC$_2$H$_4$OH | 1.5 |
| 108 | Cu | —SO$_2$—(CH$_2$)$_3$CO$_2$CH$_2$CH$_2$OCH$_3$ | 2 | —SO$_2$—(CH$_2$)$_3$SO$_2$NHCH(CH$_3$)CH$_2$OH | 2 |
| 109 | Cu | —SO$_2$CH$_2$CH$_2$CH(CH$_3$)SO$_2$NH(CH$_2$)$_3$OCH$_3$ | 3 | —SO$_2$—(CH$_2$)$_3$SO$_2$NHCH(OH)CHCH$_3$ | 1 |
| 110 | Cu | —SO$_2$—(CH$_2$)$_3$SO$_2$NH(CH$_2$)$_3$OCH(CH$_3$)$_2$ | 3 | —SO$_2$—(CH$_2$)$_3$CONH(CH$_2$)$_3$OCH(CH$_3$)$_2$ | 1 |

TABLE 3

In the following table, the introduction positions of the substituents ($R_1$) and ($R_2$) in each compound are exchangeable with each other in the β-position substitution type phthalocyanine dye (indicating the isomers represented by formulae (a)-1 to (a)-4). The values of k and l each represents a mean value of a mixing ratio based on a feeding molar ratio (eq./eq.) of the phthalonitrile derivatives used in the synthesis of the phthalocyanine derivative.

$$M-Pc\begin{matrix}(R_1)_k\\(R_2)_l\end{matrix}$$

| Compound No. | M | $R_1$ | k | $R_2$ | l |
|---|---|---|---|---|---|
| 111 | Cu | —SO$_2$—C$_6$H$_4$(CH$_3$)(CO$_2$CH(CH$_3$)CH$_2$OCH$_3$) | 3 | —SO$_2$—(CH$_2$)$_3$SO$_2$NHCH$_2$CH(OH)CH$_3$ | 1 |
| 112 | Cu | —SO$_2$—C$_6$H$_4$—CONH(CH$_2$)$_3$OCH$_2$CH(C$_2$H$_5$)C$_4$H$_9$ | 3 | —SO$_2$—(CH$_2$)$_3$SO$_2$NHCH$_2$CH(OH)CH$_2$OH | 1 |

TABLE 3-continued

In the following table, the introduction positions of the substituents (R₁) and (R₂) in each compound are exchangeable with each other in the β-position substitution type phthalocyanine dye (indicating the isomers represented by formulae (a)-1 to (a)-4). The values of k and l each represents a mean value of a mixing ratio based on a feeding molar ratio (eq./eq.) of the phthalonitrile derivatives used in the synthesis of the phthalocyanine derivative.

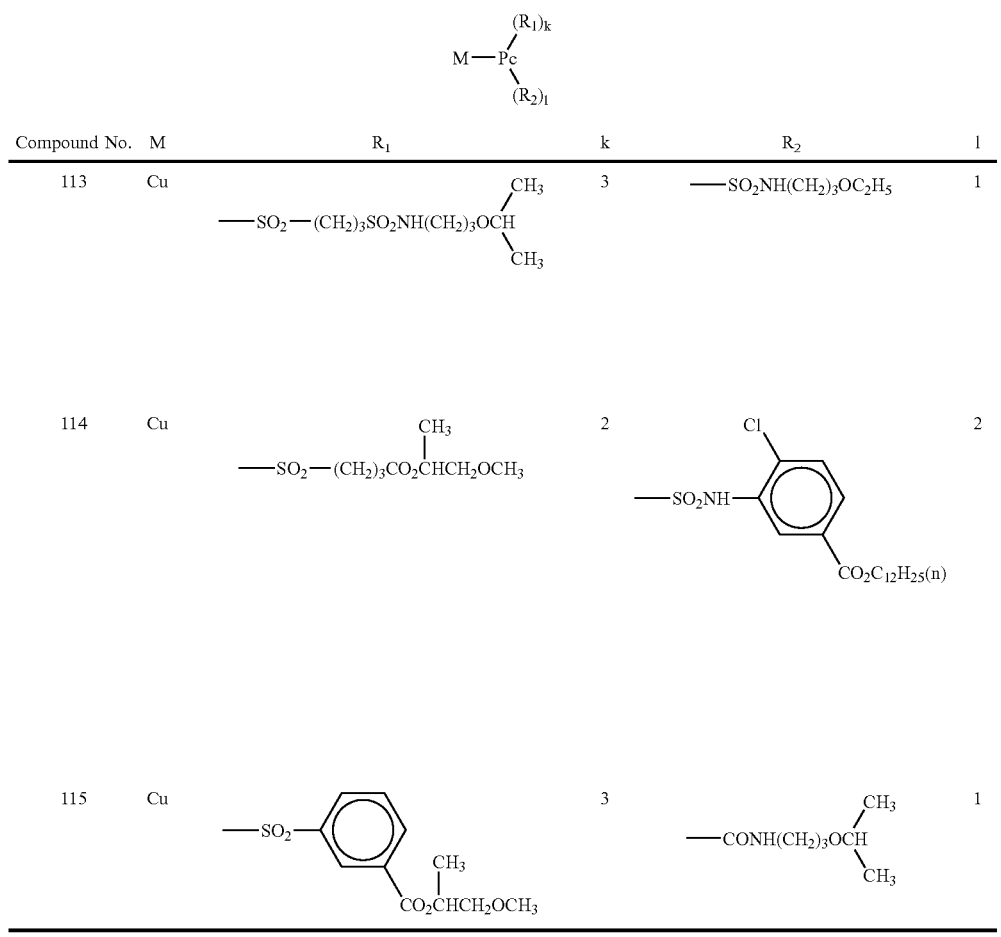

In Table 4 below, formula (XIII) represents a (k+l+m) valent phthalocyanine nucleus (introduction positions of the substituents R are β-positions as defined in the invention). R represents $R_1$ and/or $R_2$ and/or $R_3$ t represents a number of $1 < t \leq 2$ k represents a number of $0 < k < 8$, l represents a number of $0 < l < 8$ and m represents a number of $0 < m < 8$, provided that k, l and m satisfy $4 \leq k+l+m \leq 8$.

Formula (XIII)

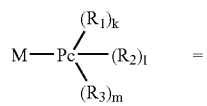

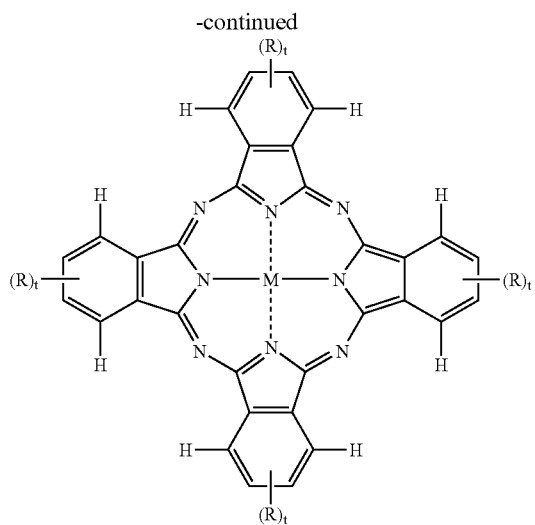

TABLE 4

In the following table, the introduction positions of the substituents (R₁), (R₂) and (R₃) in each compound are exchangeable with each other in the β-position substitution type phthalocyanine dye (indicating the isomers represented by formulae (a)-1 to (a)-4). The values of k, l and m each represents a mean value of a mixing ratio based on a feeding molar ratio (eq./eq./eq.) of the phthalonitrile derivatives used in the synthesis of the phthalocyanine derivative.

$$M-Pc\begin{matrix}(R_1)_k \\ (R_2)_l \\ (R_3)_m\end{matrix}$$

| Compound No. | M | $R_1$ | k | $R_2$ | l | $R_3$ | m |
|---|---|---|---|---|---|---|---|
| 116 | Cu | $-SO_2-(CH_2)_3SO_2NH(CH_2)_3OCH(CH_3)_2$ | 2 | $-SO_2-(CH_2)_3CO_2CH(CH_3)CH_2OCH_3$ | 1 | $-SO_2-(CH_2)_3SO_2NHCH_2CH(OH)CH_3$ | 1 |
| 117 | Ni | $-SO_2-(CH_2)_3SO_2NH(CH_2)_3OCH(CH_3)_2$ | 2 | $-SO_2-(CH_2)_3CO_2CH(CH_3)CH_2OCH_3$ | 1 | $-SO_2-(CH_2)_3SO_2NHCH_2CH(OH)CH_3$ | 1 |
| 118 | Zn | $-SO_2-(CH_2)_3SO_2NH(CH_2)_3OCH(CH_3)_2$ | 2 | $-SO_2-(CH_2)_3CO_2CH(CH_3)CH_2OCH_3$ | 1 | $-SO_2-(CH_2)_3SO_2NHCH_2CH(OH)CH_3$ | 1 |
| 119 | Cu | $-SO_2-(CH_2)_3SO_2NH(CH_2)_3OCH(CH_3)_2$ | 2 | $-SO_2-(CH_2)_3SO_2NHCH_2CH(OH)CH_2OH$ | 1 | $-SO_2NH(CH_2)_3OCH(CH_3)_2$ | 1 |
| 120 | Cu | $-SO_2-(CH_2)_3CO_2CH(CH_3)CH_2OCH_3$ | 2 | $-SO_2-\text{C}_6\text{H}_4-CH(CH_3)CO_2CH(CH_3)CH_2OCH_3$ | 1 | $-SO_2NH(CH_2)_3OCH(CH_3)_2$ | 1 |

In Table 5 below, formula (XIV) represents a (k+l+m+n) valent phthalocyanine nucleus (introduction positions of the substituents R are β-positions as defined in the invention). R represents $R_1$ and/or $R_2$ and/or $R_3$ and/or $R_4$ t represents a number of $1<t\leq 2$ k represents number of $0<m<8$ and n represents a number of $0<n<8$, provided that k, l, m and n satisfy $4\leq k+l+m+n\leq 8$.

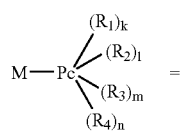

Formula (XIV)

-continued

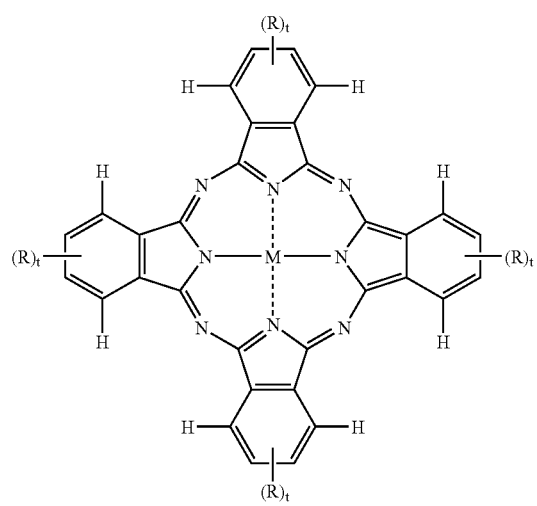

TABLE 5

In the following table, the introduction positions of the substituents ($R_1$), ($R_2$), ($R_3$) and ($R_4$) in each compound are exchangeable with each other in the β-position substitution type phthalocyanine dye (indicating the isomers represented by formulae (a)-1 to (a)-4). The values of k, l, m and n each represents a mean value of a mixing ratio based on a feeding molar ratio (eq./eq./eq./eq.) of the phthalonitrile derivatives used in the synthesis of the phthalocyanine derivative.

$$M-Pc\begin{matrix}(R_1)_k\\(R_2)_l\\(R_3)_m\\(R_4)_n\end{matrix}$$

| Compound No. | M | $R_1$ | k | $R_2$ | l |
|---|---|---|---|---|---|
| 121 | Cu | —SO$_2$—(CH$_2$)$_3$SO$_2$NH(CH$_2$)$_3$OCH(CH$_3$)$_2$ | 1 | —SO$_2$—C$_6$H$_4$—CO$_2$CH(CH$_3$)CH$_2$OCH$_3$ | 1 |
| 122 | Cu | —SO$_2$—(CH$_2$)$_3$SO$_2$NH(CH$_2$)$_3$OCH(CH$_3$)$_2$ | 1 | —SO$_2$—(CH$_2$)$_3$CO$_2$CH(CH$_3$)CH$_2$OCH$_3$ | 1 |
| 123 | Cu | —SO$_2$—(CH$_2$)$_3$SO$_2$NH(CH$_2$)$_3$OCH(CH$_3$)$_2$ | 1 | —SO$_2$NH(CH$_2$)$_3$OCH(CH$_3$)$_2$ | 1 |
| 124 | Cu | —SO$_2$—(CH$_2$)$_3$CO$_2$CH(CH$_3$)CH$_2$OCH$_3$ | 1 | —SO$_2$NH(CH$_2$)$_3$OCH(CH$_3$)$_2$ | 1 |
| 125 | Cu | —SO$_2$—(CH$_2$)$_3$CO$_2$CH(CH$_3$)CH$_2$OCH$_3$ | 1 | —CONH(CH$_2$)$_3$OCH(CH$_3$)$_2$ | 1 |

| Compound No. | $R_3$ | m | $R_4$ | n |
|---|---|---|---|---|
| 121 | —SO$_2$(CH$_2$)$_3$SO$_2$NHCH$_2$CH(OH)CH$_3$ | 1 | —SO$_2$(CH$_2$)$_3$SO$_2$NHCH(CH$_3$)CH$_2$OH | 1 |
| 122 | —SO$_2$(CH$_2$)$_3$SO$_2$NHCH$_2$CH(OH)CH$_3$ | 1 | —SO$_2$(CH$_2$)$_3$SO$_2$NHCH(CH$_3$)CH$_2$OH | 1 |
| 123 | —SO$_2$(CH$_2$)$_3$SO$_2$NHCH$_2$CH(OH)CH$_3$ | 1 | —SO$_2$(CH$_2$)$_3$SO$_2$NHCH(CH$_3$)CH$_2$OH | 1 |
| 124 | —SO$_2$(CH$_2$)$_3$SO$_2$NHCH$_2$CH(OH)CH$_3$ | 1 | —SO$_2$(CH$_2$)$_3$SO$_2$NHCH(CH$_3$)CH$_2$OH | 1 |
| 125 | —SO$_2$(CH$_2$)$_3$SO$_2$NHCH$_2$CHCH$_3$OH(OH) | 1 | —SO$_2$NHCH(OH)CH$_2$OH | 1 |

Heretofore, a phthalocyanine derivative is used as a mixture of isomers different in introduction positions of specific substituents (or number of substituents introduced in some cases). On the contrary, the compounds according to the invention (compounds represented by formulae (I), (II), (III) and (IV): phthalocyanine derivatives having the specific structures obtained by selectively introducing the specific number of the specific substituents into the specific positions) are novel compounds having the specific structures, which have heretofore not been separated and acknowledged. The performances based on the specific structure are extremely effective for dyes and intermediates of synthesis of dyes for inkjet recording having increased functionality.

In more detail, applications of the dye mixture of the invention include, for example, color composition (material for forming images, particularly color images, for example, ink or paint) containing a medium and the dye mixture. Specifically, examples of the application include, starting with recording materials for inkjet recording (ink), image recording materials of heat-sensitive transfer type, pressure-sensitive recording materials, recording materials using electrophotographic system, dry type silver halide photosensitive materials, printing inks and recording pens, preferably, recording materials for inkjet recording (ink) image recording materials of heat-sensitive transfer type and recording materials using electrophotographic system, and more preferably recording materials for inkjet recording (ink). The color mixture also applied to color filters employed in LCD or solid image sensor, for example, CCD described, for example, in U.S. Pat. No. 4,808,501 and JP-A-6-35182, and coloring solutions for dying various fibers. The phthalocyanine compound according to the invention can be used by controlling its physical properties, for example, solubility or heat-mobility suitable for the specific use according to the substituents thereof.

[Inkjet Recording Ink]

The inkjet recording ink according to the invention is described below.

The inkjet recording ink can be prepared by dissolving and/or dispersing the phthalocyanine dye mixture described above in an oleophilic medium or an aqueous medium. Ink using an aqueous medium is preferable, and it is preferred to prepare by dispersing the phthalocyanine dye mixture described above directly or an emulsified dispersion of the phthalocyanine dye mixture described above in an aqueous medium.

Other additives may be incorporated into the ink within the range where the effects of the invention are not impaired, if desired. Examples of other additives include know additives, for example, drying inhibitor (wetting agent), discoloration preventing agent, emulsion stabilizer, permeation accelerator, ultraviolet absorber, antiseptic, fungicide, pH adjusting agent, surface tension adjusting agent, defoaming agent, viscosity adjusting agent, dispersant, dispersion stabilizer, corrosion preventing agent or chelating agent. The additives are preferably added to the aqueous medium. They may be added to a dispersion after the preparation of dye dispersion or added to an oil phase or an aqueous phase at the preparation of dye dispersion.

The drying inhibitor is preferably used for the purpose of preventing the occurrence of clogging due to drying of inkjet ink at an ink ejection orifice of a nozzle used in the inkjet recording system.

The drying inhibitor used is preferably a water-soluble organic solvent having a vapor pressure lower than water. Specific examples thereof include a polyhydric alcohol, for example, ethylene glycol, propylene glycol, diethylene glycol, polyethylene glycol, thiodiglycol, dithiodiglycol, 2-methyl-1,3-propanediol, 1,2,6-hexanetriol, an acetylene glycol derivative, glycerin or trimethylolpropane; a lower alkyl ether of polyhydric alcohol, for example, ethylene glycol monomethyl (or ethyl) ether, diethylene glycol monomethyl (or ethyl) ether or triethylene glycol monoethyl (or butyl) ether; a heterocyclic compound, for example, 2-pyrrolidone, N-methyl-2-pyrrolidone, 1,3-dimethyl-2-imidazolidinone or N-ethylmorpholine; a sulfur-containing compound, for example, sulfolane, dimethylsulfoxide or 3-sulfolene; a polyfunctional compound, for example, diacetone alcohol or diethanolamine; and a urea derivative. Among them, a polyhydric alcohol, for example, glycerin or diethylene glycol is preferred. The drying inhibitors may be used individually or in combination of two or more thereof. The drying inhibitor is preferably contained in an amount of 10 to 50% by weight in the ink.

The permeation accelerator is preferably used for the purpose of accelerating permeation of inkjet ink into paper. Examples of the permeation accelerator used include an alcohol, for example, ethanol, isopropanol, butanol, di(tri) ethylene glycol monobutyl ether or 1,2-hexanediol, sodium laurylsulfate, sodium oleate and a nonionic surfactant. A sufficiently high effect can be ordinarily obtained by adding the permeation accelerator in an amount of 5 to 30% by weight to the ink. It is preferred that the permeation accelerator is used in an amount of causing no blurring of print or no print through.

The ultraviolet absorber is used for improving the preservability of image. Examples of the ultraviolet absorber used include benzotriazole compounds described, for example, in JP-A-58-185677, JP-A-61-190537, JP-A-2-782, JP-A-5-197075 and JP-A-9-34057, benzophenone compounds described, for example, in JP-A-46-2784, JP-A-5-94483 and U.S. Pat. No. 3,214,463, cinnamic acid compounds described, for example, in JP-B-48-30492(the term "JP-B" as used herein means an "examined Japanese patent publication"), JP-B-56-21141 and JP-A-10-88106, triazine compounds described, for example, in JP-A-4-298503, JP-A-8-53427, JP-A-8-239368, JP-A-10-182621 and JP-T-8-501291 (the term "JP-T" as used herein means a "published Japanese translation of a PCT patent application"), compounds described in Research Disclosure, No. 24239, and compounds of absorbing ultraviolet ray and emitting fluorescent light, so-called fluorescent brightening agents, as typified by stilbene compounds and benzoxazole compounds.

The discoloration preventing agent is used for improving the preservability of image. As for the discoloration preventing agent, various organic or metal complex discoloration preventing agents can be used. Examples of the organic discoloration preventing agent include a hydroquinone, an alkoxyphenol, a dialkoxyphenol, a phenol, an aniline, an amine, an indane, a chroman, an alkoxyaniline and a heterocyclic compound. Examples of the metal complex discoloration preventing agent include a nickel complex and a zinc complex. More specifically, compounds described in patents cited in Research Disclosure, No. 17643, Items VII-I to VII-J, No. 15162, No. 18716, page 650, left column, No. 36544, page 527, No. 307105, page 872 and No. 15162, and compounds included in formulae of representative compounds and in examples of compounds described in JP-A-62-215272, pages 127 to 137 can be used.

Examples of the fungicide include sodium dehydroacetate, sodium benzoate, sodium pyridinethione-1-oxide, ethyl p-hydroxybenzoate, 1,2-benzisothiazolin-3-one and a salt thereof. The fungicide is preferably used in an amount of 0.02 to 1.00% by weight in the ink.

As the pH adjusting agent, the above-described neutralizing agent (organic base or inorganic alkali) can be used. The pH adjusting agent is used for the purpose of improving preservation stability of the inkjet recording ink, and it is added in an amount so that a pH of the inkjet recording ink becomes preferably from 6to 10, more preferably from 7to 10.

As the surface tension adjusting agent, a nonionic, cationic or anionic surfactant is used. A surface tension of the inkjet recording ink of the invention is preferably from 25 to 70 mN/m, more preferably from 25 to 60 mN/m. A viscosity of the inkjet recording ink of the invention is adjusted preferably to 30 mPa·s or less, more preferably to 20 mPa·s or less. Preferred examples of the surfactant include an anionic surfactant, for example, a fatty acid salt, an alkylsulfuric ester salt, an alkylbenzenesulfonate, an alkylnaphthalenesulfonate, a dialkylsulfosuccinate, an alkylphosphoric ester salt, a naphthalenesulfonic acid formalin condensate or a polyoxyethylenealkylsulfuric ester salt, and a nonionic surfactant, for example, a polyoxyethylene alkyl ether, a polyoxyethylene alkylaryl ether, a polyoxyethylene fatty acid ester, a sorbitan fatty acid ester, a polyoxyethylene sorbitan fatty acid ester, a polyoxyethylene alkylamine, a glycerin fatty acid ester or an oxyethylene oxypropylene block copolymer. Also, Surfynols (produced by Air Products & Chemicals, Inc.), which are acetylenic polyethylene oxide surfactants, are preferably used. Further, an amine oxide-type amphoteric surfactant, for example, an N,N-dimethyl-N-alkylamine oxide is preferred. In addition, surfactants described in JP-A-59-157636, pages (37) to (38) and Research Disclosure, No. 308119 (1989) can also be used.

As the defoaming agent, a fluorine-based or silicon-based compound or a chelating agent as represented by EDTA is used, if desired.

In the case of dispersing the phthalocyanine compound according to the invention in an aqueous medium, it is preferred that color fine particles containing the phthalocyanine compound and an oil-soluble polymer are dispersed in an aqueous medium as described, for example, in JP-A-11-286637, JP-A-2001-240763 (Japanese Patent Application No. 2000-78491), JP-A-2001-262039 (Japanese Patent Application No. 2000-80259) and JP-A-2001-247788 (Japanese Patent Application No. 2000-62370) or that the phthalocyanine compound according to the invention is dissolved in a high boiling point organic solvent and the resulting solution is dispersed in an aqueous medium as described, for example, in JP-A-2001-262018 (Japanese Patent Application No. 2000-78454), JP-A-2001-240763 (Japanese Patent Application No. 2000-78491), JP-A-2001-335734 (Japanese Patent Application No. 2000-203856) and Japanese Patent Application No. 2000-203857. With respect to the specific method, the oil-soluble polymer, high boiling point organic solvent and additive used and amounts thereof in the dispersion of the phthalocyanine compound according to the invention in an aqueous medium, those described in the above-described patens are preferably used. Alternatively, the phthalocyanine compound may be dispersed as a solid in the state of fine particle. At the dispersion, a dispersant or a surfactant can be used. As for the dispersing apparatus, simple stirrer, impeller stirring system, in-line stirring system, mill system (for example, colloid mill, ball mill, sand mill, attritor, roll mill or agitator mill), ultrasonic system and a high-pressure emulsification dispersion system (high-pressure homogenizer, specific examples of commercially available apparatus include Gaulin Homogenizer, Microfluidizer and DeBEE 2000). In addition to the patents described above, preparation methods of the inkjet recording ink are described in detail in JP-A-5-148436, JP-A-5-295312, JP-A-7-97541, JP-A-7-82515, JP-A-7-118584, JP-A-11-286637, JP-A-2001-271003 (Japanese Patent Application No. 2000-87539), and these are applied to the preparation of the inkjet recording ink of the invention.

As the aqueous medium, a mixture comprising water as the main component and a water-miscible organic solvent added, if desired, is preferably used. Examples of the water-miscible organic solvent include an alcohol (for example, methanol, ethanol, propanol, isopropanol, butanol, isobutanol, sec-butanol, tert-butanol, pentanol, hexanol, cyclohexanol or benzyl alcohol), a polyhydric alcohol (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol or thiodiglycol), a glycol derivative (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether or ethylene glycol monophenyl ether), an amine (for example, ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine or tetramethylpropylenediamine) and other polar solvent (for example, formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile or acetone). The water-miscible organic solvents can be used in combination of two or more thereof.

The inkjet recording ink according to the invention preferably contains the phthalocyanine compound described above from 0.1 to 20 parts by weight per 100 parts by weight of the ink. Further, other dye may be used together with the phthalocyanine compound described above in the inkjet recording ink according to the invention. In the case of using two or more dyes in combination, the total content of the dyes is preferably in the above-described range.

The ink according to the invention preferably has a viscosity of 40 cp or less. Also, the ink preferably has a surface tension of 20 mN/m to 70 mN/m. The viscosity and surface tension can be adjusted by addition of various additives, for example, viscosity adjusting agent, surface tension adjusting agent, specific resistance adjusting agent, film adjusting agent, ultraviolet absorber, antioxidant, discoloration preventing agent, fungicide, corrosion preventing agent, dispersant or surfactant.

The ink according to the invention can be used not only for the formation of a monochromatic image but also for the formation of a full color image. For the formation of a fill color image, a magenta tone ink, a cyan tone ink and a yellow tone ink can be used. Also, in order to adjust the color tone, a black tone ink may be used.

As a yellow dye, any yellow dye may be used. Examples thereof include aryl or heteryl azo dyes having a phenol, a naphthol, an aniline, a hetero-cyclic ring (e.g., pyrazolone or pyridone), an open chain-type active methylene compound or the like as a coupling component (hereinafter referred to as a "coupler component"); azomethine dyes having an open chain-type active methylene compound or the like as the coupler component; methine dyes, for example, benzylidene dye or monomethine oxonol dye; and quinone dyes, for example, naphthoquinone dye or anthraquinone dye. Other examples of the dye species include quinophthalone dye, nitro•nitroso dye, acridine dye and acridinone dye.

As a magenta dye, any magenta dye may be used. Examples thereof include aryl or heteryl azo dyes having a phenol, a naphthol, an aniline or the like as the coupler component; azomethine dyes having a pyrazolone, a pyrazolotriazole or the like as the coupler component; methine dyes, for example, arylidene dye, styryl dye, merocyanine dye, cyanine dye or oxonol dye; carbonium dyes, for example, diphenylmethane dye, triphenylmethane dye or xanthene dye; quinone dyes, for example, naphthoquinone, anthraquinone or anthrapyridone; and condensed polycyclic dyes, for example, dioxazine dye.

As a cyan dye, any cyan dye may be used. Examples thereof include aryl or heteryl azo dyes having a phenol, a naphthol, an aniline or the like as the coupler component; azomethine dyes having a phenol, a naphthol, a heterocyclic ring (e.g., pyrrolotriazole) or the like as the coupler component; polymethine dyes, for example, cyanine dye, oxonol dye or merocyanine dye; carbonium dyes, for example, diphenylmethane dye, triphenylmethane dye or xanthene dye; phthalocyanine dyes including the mixture according to the invention; anthraquinone dyes; and indigo•thioindigo dyes.

The dye may be a dye, which provides a yellow, magenta or cyan color for the first time when a part of the chromophore is dissociated. In this case, the counter cation may be an inorganic cation, for example, alkali metal or ammonium, an organic cation, for example, pyridinium and quaternary ammonium salt, or a polymer cation having such a cation as a partial structure.

Examples of black coloring material used include disazo, trisazo and tetraazo dyes and a dispersion of carbon black.

[Inkjet Recording Method]

According to the inkjet recording method of the invention, an energy is applied to the ink, thereby forming an image on a known image-receiving material, specifically, plain paper, resin coated paper, inkjet special paper described, for example, in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597 and JP-A-10-337947, film, common electrophotographic paper, cloth, glass, metal, ceramic or the like.

In the formation of image, a dispersion of fine polymer particles (hereinafter, also referred to as a polymer latex) may be used in combination for the purpose of imparting glossiness or water resistance or improving weather resistance. The timing of imparting the polymer latex to the image-receiving material may be before or after imparting the coloring agent or simultaneously with it. Accordingly, the position to which the polymer latex is added may be the image-receiving paper or ink, or a liquid material composed of the polymer latex alone may be prepared and used. More specifically, methods described, for example, in Japanese Patent Application Nos. 2000-363090, 2000-315231, 2000-354380, 2000-343944, 2000-268952, 2000-299465 and 2000-297365 can be preferably used.

The recording paper and recording film used in the inkjet printing using the ink according to the invention are described below.

A support, which can be used for the recording paper or film, is produced, for instance, from a chemical pulp, for example, LBKP or NBKP, a mechanical pulp, for example, GP, PGW, RMP, TMP, CTMP, CMP or CGP, a waste paper pulp, for example, DIP, and, if desired, by mixing an additive, for example, conventionally known pigment, binder, sizing agent, fixing agent, cation agent or paper strength increasing agent and then sheeting the mixture using various devices, for example, Fourdrinier paper machine or cylinder paper machine. Other than these support, synthetic paper or plastic film may be used. The thickness of the support is preferably from 10 to 250 µm and the basis weight thereof is preferably from 10 to 250 g/m².

An ink-receptive layer and a backcoat layer may be provided on the support as it is or may be provided after applying size press or an anchor coat layer using starch, polyvinyl alcohol or the like to the support. The support may also be subjected to a flattening treatment by a calendering device, for example, machine calender, TG calender or soft calender. In the invention, paper, both surfaces of which are laminated with polyolefin (for example, polyethylene, polystyrene, polyethylene terephthalate, polybutene or a copolymer thereof) or plastic film is preferably used as the support.

In the polyolefin, a white pigment (for example, titanium oxide or zinc oxide) or a tinting dye (for example, cobalt blue, ultramarine or neodymium oxide) is preferably added.

The ink-receptive layer provided on the support contains a pigment and an aqueous binder. The pigment is preferably a white pigment. The white pigment includes a white inorganic pigment, for example, calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide or zinc carbonate, and an organic pigment, for example, styrene-based pigment, acryl-based pigment, urea resin or melamine resin. The white pigment contained in the ink-receptive layer is preferably a porous inorganic pigment, more preferably synthetic amorphous silica having a large pore area. The synthetic amorphous silica may be either a silicic acid anhydride obtained by a dry production method or a silicic acid hydrate obtained by a wet production method and is preferably a silicic acid hydrate.

Examples of the aqueous binder contained in the ink-receptive layer include a water-soluble polymer, for example, polyvinyl alcohol, silanol-modified polyvinyl alcohol, starch, cationized starch, casein, gelatin, carboxymethyl cellulose, hydroxyethyl cellulose, polyvinylpyrrolidone, polyalkylene oxide or a polyalkylene oxide derivative, and a water-dispersible polymer, for example, styrene butadiene latex or acryl emulsion. The aqueous binders can be used individually or in combination of two or more thereof. Among them, polyvinyl alcohol and silanol-modified polyvinyl alcohol are preferred in the invention in view of adhesion property to the pigment and peeling resistance of the ink-receptive layer.

The ink-receptive layer may contain a mordant, a water-proofing agent, a light fastness improver, a surfactant and other additives in addition to the pigment and the aqueous binder.

The mordant added to the ink-receptive layer is preferably immobilized and for this purpose, a polymer mordant is preferably used.

The polymer mordant is described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236 and U.S. Pat. Nos. 2,484,430, 2,548,564, 3,148,061, 3,309,690, 4,115,124, 4,124,386, 4,193,800, 4,273,853, 4,282,305 and 4,450,224. An image-receiving material containing the polymer mordant described in JP-A-1-161236, pages 212 to 215 is particularly preferred. When the polymer mordant described in the patent is used, an image having excellent image quality can be obtained and at the same time, light fastness of the image is improved.

The water-proofing agent is effective for making the image water-proof. The water-proofing agent is preferably a cationic resin. Examples of the cationic resin include polyamidopolyamine epichlorohydrin, polyethyleneimine, polyaminesulfone, poly-dimethyldiallylammonium chloride, cation polyacrylamide and colloidal silica. Of the cationic resins, polyamidopolyamine epichlorohydrin is preferred. The content of the cationic resin is preferably from 1 to 15% by weight, more preferably from 3 to 10% wt by weight, based on the total solid content of the ink-receptive layer.

Examples of the light fastness improver include zinc sulfate, zinc oxide, a hindered amine-based antioxidant and a benzophenone-based or benzotriazole-based ultraviolet absorber. Among them, zinc sulfate is preferred.

The surfactant functions as a coating aid, a peeling property improver, a sliding property improver or an antistatic agent. The surfactant is described in JP-A-62-173463 and JP-A-62-183457. In place of the surfactant, an organic fluoro compound may be used. The organic fluoro compound is preferably hydrophobic. Examples of the organic fluoro compound include a fluorine-based surfactant, an oily fluorine-based compound (for example, fluorine oil) and a solid fluorine compound resin (for example, ethylene tetrafluoride resin). The organic fluoro compound is described in JP-B-57-9053, columns 8 to 17, JP-A-61-20994 and JP-A-62-135826. Other additives added to the ink-receptive layer include, for example, a pigment dispersant, a thickening agent, a defoaming agent, a dye, a fluorescent brightening agent, an antiseptic, a pH adjusting agent, a matting agent and a hardening agent. The ink-receptive layer may be either one layer or two layers.

In the recording paper or film, a backcoat layer may also be provided. Examples of the component, which can be added to the layer, include a white pigment, an aqueous binder and other components. Examples of the white pigment contained in the backcoat layer include a white inorganic pigment, for example, precipitated calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudoboehmite, aluminum hydroxide, alumina, lithopone, zeolite, hydrolyzed halloysite, magnesium carbonate or magnesium hydroxide, and an organic pigment, for example, styrene-based plastic pigment, acryl-based plastic pigment, polyethylene, microcapsule, urea resin or melamine resin.

Examples of the aqueous binder contained in the backcoat layer include a water-soluble polymer, for example, styrene/maleic acid salt copolymer, styrene/acrylic acid salt copolymer, polyvinyl alcohol, silanol-modified polyvinyl alcohol, starch, cationized starch, casein, gelatin, carboxymethyl cellulose, hydroxyethyl cellulose or polyvinylpyrrolidone, and a water-dispersible polymer, for example, styrene butadiene latex or acryl emulsion. Other components contained in the backcoat layer include, for example, a defoaming agent, a foam inhibitor, a dye, a fluorescent brightening agent, an antiseptic and a water-proofing agent.

A polymer latex may be added to a constituent layer (including the backcoat layer) of the inkjet recording paper or film. The polymer latex is used for the purpose of improving film properties, for example, stabilizing dimension and preventing curling, adhesion or film cracking. The polymer latex is described in JP-A-62-245258, JP-A-62-1316648 and JP-A-62-110066. When a polymer latex having a low glass transition temperature (40° C. or less) is added to a layer containing the mordant, the layer can be prevented from cracking or curling. Also, by adding a polymer latex having a high glass transition temperature to the backcoat layer, curling can be prevented.

The ink according to the present is not limited with respect to the inkjet recording system and can be used in a known system, for example, an electric charge controlling system of ejecting the ink using an electrostatic induction force, a drop-on-demand system (pressure pulse system) of using an oscillation pressure of a piezoelectric device, an acoustic ink jet system of converting electric signals into acoustic beams, irradiating the beams on the ink and ejecting the ink using the radiation pressure, or a thermal ink jet system of heating the ink to form bubbles and utilizing the generated pressure. The inkjet recording system also includes a system of ejecting a large number of small volumes of so-called photo-ink having a low concentration, a system designed to improve the image quality by using a plurality of inks each having substantially the same hue but a different concentration, and a system of using colorless transparent ink.

[Color Toner]

The color toner composition according to the invention is characterized by containing at lest one of the phthalocyanine compounds represented by formula (I) described above. The color toner composition according to the invention contains, if desired, a binder resin for color toner, a mold release agent, a charge controlling agent or a carrier, in addition to the dye according to the invention.

A content of the phthalocyanine compound of the invention is preferably 0.1 part by weight or more (preferably 15 parts by weight or less), particularly preferably 1.0 part by weight or more (preferably 10 parts by weight or less), per 100 parts by weight of the color toner composition according to the invention.

As the binder resin for color toner to introduce the phthalocyanine compound of the invention, any binder resin ordinarily used can be employed. Examples of the binder resin include a styrene resin, acryl resin, styrene/acrylic resin and polyester resin.

Inorganic fine powder or organic fine powder may be externally added to the color toner composition for the purpose of improving fluidity of the toner or controlling electric charge of the toner. Silica fine particles or titania fine particles, surface of which is treated with a coupling agent having an alkyl group, are preferably used. The fine particle preferably has a number average primary particle diameter of 10 to 500 nm, and it is preferably added to the toner composition in an amount of 0.1 to 20% by weight.

As for the mold release agent, any mold release agent conventionally used can be employed. Specific examples thereof include an olefin, for example, low molecular weight polypropylene, low molecular weight polyethylene or ethylene-propylene copolymer, microcrystalline wax, carnauba wax, Sasol wax and paraffin wax. The mold release agent is preferably added to the toner composition in an amount of 1 to 5% by weight.

The charge controlling agent may be added, if desired, and it is preferred to be colorless in view of coloring. Example of the charge controlling agent include compound having a quaternary ammonium salt structure and compound having a calixarene structure.

Any non-coating carrier only composed of magnetic material particle, for example, iron or ferrite, and resin coated carrier obtained by coating surface of magnetic material particle with a resin or the like can be used as the +carrier. An average diameter of the carrier is preferably from 30 to 150 μm in terms of a volume average diameter.

An image forming method to which the color toner composition according to the invention is applied is not particularly restricted. Examples thereof include a method of forming an image comprising repeatedly forming a color image on a photosensitive material and then transferring the color image and a method of forming an image comprising transferring serially an image formed on a photosensitive material to an intermediate transfer material to form a color image on the intermediate transfer material and then transferring the color image to an image forming material, for example, paper.

[Color Filter]

A method for forming a color filter includes a method of initially forming a pattern with photoresist and then dying the pattern and a method of forming a pattern with photoresist having a dye added described in JP-A-4-163552, JP-A-4-128703 and JP-A-4-175753.

Any of the methods can be used in order to incorporate the phthalocyanine compound according to the invention into a color filter. Methods of forming a color filter comprising preparing a positive resist composition containing a thermosetting resin, a quinonediazide compound, a crosslinking agent, a coloring agent and a solvent, coating the positive resist composition on a substrate, exposing the coating through a mask, developing the exposed coating to form a positive resist pattern, overall exposing the positive resist pattern, and hardening the exposed positive resist pattern as described in JP-A-4-175753 and JP-A-6-35182 are preferably used. Further, a RGB primary color filter or a YMC subtractive color filter can be obtained by forming a black matrix according to a conventional method.

With respect to the thermosetting resin, quinonediazide compound, crosslinking agent, coloring agent and solvent, and the amounts thereof, those described in the above-described patents can be preferably used.

EXAMPLES

The present invention will be described in more detail with reference to the following examples, but the invention should not be construed as being limited thereto.

Example 1

Preparation of Ink Solution A

In a mixture of 4.22 g of High Boiling Point Organic Solvent (s-2) shown below, 5.63 g of High Boiling Point Organic Solvent (s-11) shown below and 50 ml of ethyl acetate were dissolved 5.3 g of phthalocyanine compound (Compound 101 described hereinbefore) and 7.04 g of sodium dioctylsulfosuccinate at 70° C. To the solution was added 500 ml of deionized water under stirring with a magnetic stirrer to prepare a coarse particle dispersion of oil droplet-in-water type. The coarse particle dispersion was passed through Microfluidizer (produced by Microfluidex Inc.) at a pressure, of 60 MPa (600 bar) 5 times to prepare an emulsion of fine particles. The emulsion was subjected to removal of solvent by a rotary evaporator until odor of the ethyl acetate went out. To the resulting fine emulsion of hydrophobic dye were added 140 g of diethylene glycol, 50 g of glycerin, 7 g of Surfynol 465 (produced by Air Products & Chemicals, Inc.) and 900 ml of deionized water to prepare Ink Solution A.

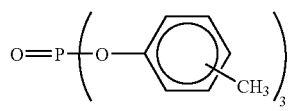
s-2

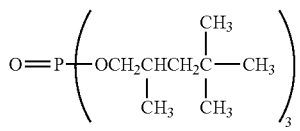
s-11

(Preparation of Ink Solutions B to E)

Ink Solutions B to E were prepared in the same manner as in Ink Solution A except for changing the phthalocyanine compound (Compound 101 described hereinbefore) to each phthalocyanine compound shown in Table 6 below. Ink Solutions 101 and 102 for comparison were also prepared using Comparative Compound 1 and Comparative Compound 2 shown below, respectively.

Comparative Compound 1

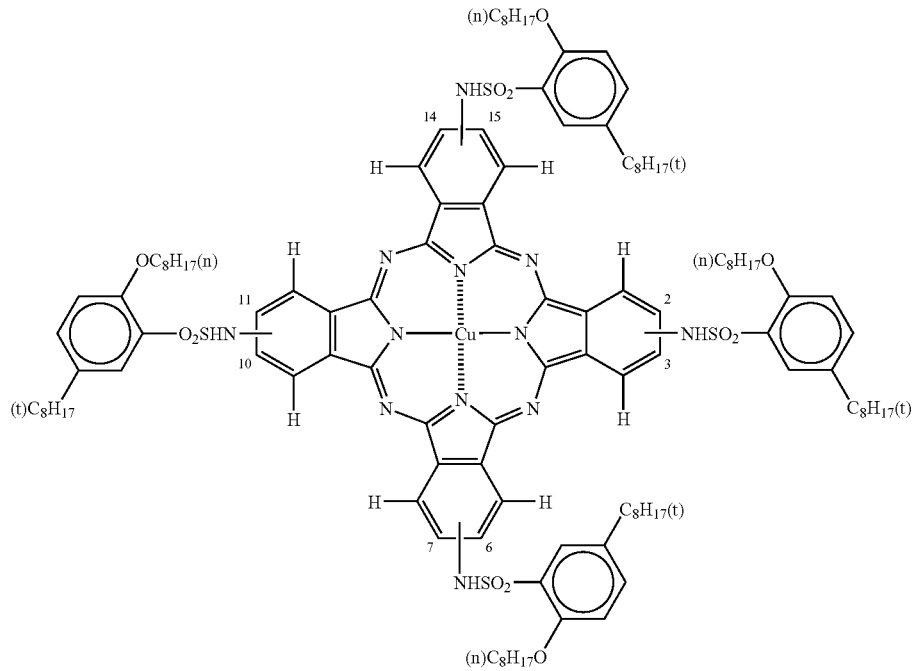

-continued

Comparative Compound 2

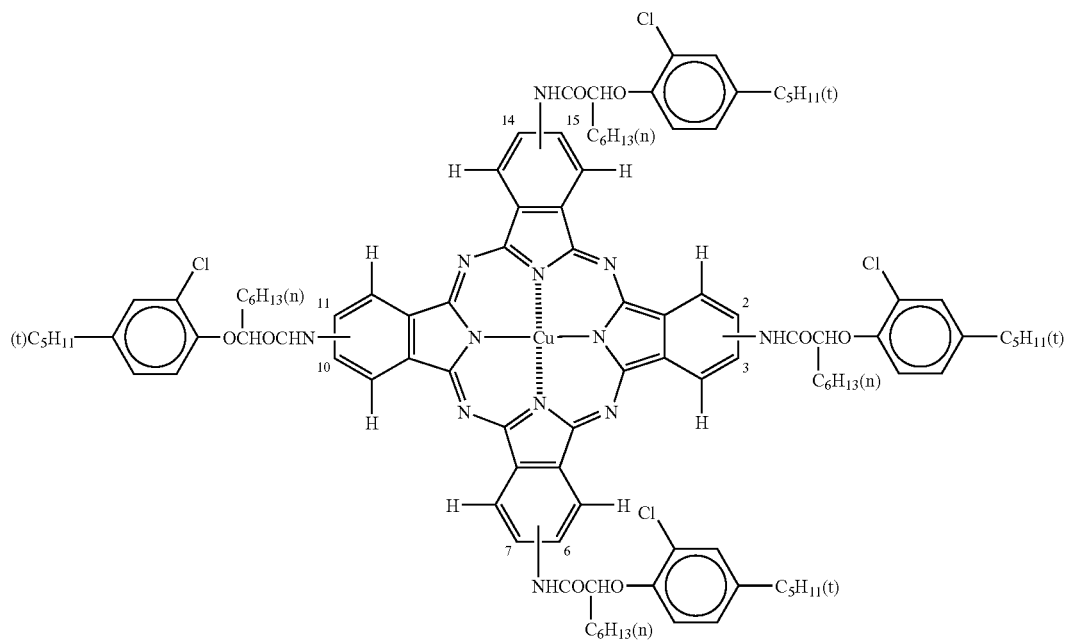

In the case of changing the dye, the dye was used such that the amount added thereof became equimolar to the amount of dye in Ink Solution A.

(Image Recording and Evaluation)

With respect to the inkjet inks of Examples (Ink Solutions A to E) and Comparative Examples (Ink Solutions 101 and 102), the following evaluations were performed. The results obtained are shown in Table 6 below.

In Table ,6, "color tone", "paper dependency", "water resistance" and "light fastness" were evaluated after an image was recorded using each of the inkjet inks on Photo Paper "Gloss" (KA450PSK, EPSON, produced by Seiko Epson Corp.) by an inkjet printer (PM-700C, produced by Seiko Epson Corp.).

<Color Tone>

The image formed on Photo Paper "Gloss" was subjected to colorimetry of the reflection spectrum at intervals of 10 nm in the region from 390 to 730 nm using Gretag SPM100-II (produced by Gretag) and from the data, a* and b* were calculated based on the CIE (International Commission on Illumination) L*a*b* color space system.

By comparing with the standard cyan color sample of Japan Colour of JNC (Japan Printing Machinery Manufacturers Association) (color obtained by conducting colorimetry of solid patch for proof provided from 21 companies as members of the Japan Printing Machinery Manufacturers Association and performing printing using Japan Colour Ink SF-90 and Japan Paper so as to give a smallest color difference ($\Delta E$) from an average value of the colorimetry), a preferred cyan color tone was defined as follows:

When L* is in the range of 53.6±0.2,
○: a* is in the range of −35.9±6 and b* is in the range of −50.4±6.
△: only one of a* and b* is in the preferred region defined in ○ above.
×: neither a* nor b* be out of the preferred region defined in ○ above).

The colorimetry values of the standard cyan color sample of Japan Colour used as the reference are shown below:
L*: 53.6±0.2
a*: −37.4±0.2
b*: −50.2±0.2
$\Delta E$: 0.4 (0.1 to 0.7)
(1) Printing machine: Manroland R-704; Ink: Japan Colour SF-90; Paper: Tokuhishi Art
(2) Colorimetry Colorimeter: X-rite 938, 0/45, D50, 2 deg.; black backing <Paper Dependency>

The image formed on the Photo Paper "Gloss" described above and an image separately formed on Professional Photo Paper PR101 (QBJPRA4, produced by Canon Inc.) were compared on the color tone. The evaluation was performed by a two-stage rating. Specifically, the case where the difference between two images was small was rated A (good), and the case where the difference between two images is large was rated B (poor).

<Water Resistance>

The Photo Paper "Gloss" having an image formed thereon was dried at room temperature for one hour, dipped in deionized water for 10 seconds and then naturally dried at room temperature. Blurring was observed and evaluated by a three-stage rating. Specifically, the case where the blurring was not observed was rated A, the case where the blurring was slightly observed was rated B, and the case the blurring was seriously observed was rated C.

<Light Fastness>

The Photo Paper "Gloss" having an image formed thereon was irradiated with xenon light (85,000 1x) for 14 days using Weatherometer (Atlas C. I65). The image density before and after the xenon irradiation was measured by a reflection densitometer (X-Rite 310TR) and evaluated as a dye residual ratio. The reflection density was measured at three points of 1, 1.5 and 2.0. The dye residual ratio was evaluated by a three-stage rating. Specifically, the case where the dye residual ratio was 70% or more at all points was rated A, the case where the dye residual ratio was less than 70% at one or two points was rated B, and the case where the dye residual ratio was less than 70% at all points was rated C.

<Dark Heat Preservability>

The Photo Paper "Gloss" having an image formed thereon was stored for 14 days under the conditions of 80° C. and 15% RH. The image density before and after the storage was measured by a reflection densitometer (X-Rite 310TR) and evaluated as the dye residual ratio. The dye residual ratio was evaluated at three points having a reflection density of 1, 1.5 and 2.0. The case where the dye residual ratio was 90% or more at all points was rated A, the case where the dye residual ratio was less than 90% at two points was rated B, and the case where the dye residual ratio was less than 90% at all points was rated C.

<Ozone Gas Resistance>

In a box adjusting an ozone gas concentration of 0.5±0.1 ppm using a Siemens-type ozonizer to which an alternating current voltage of 5 kV was applied while passing dry air through the double glass tube thereof at room temperature in a dark place, the Photo Paper "Gloss" having an image formed thereon was allowed to stand for 14 days. The image density before and after the standing in an ozone gas atmosphere was measured by a reflection densitometer (X-Rite 310TR) and evaluated as the dye residual ratio. The reflection density was measured at three points of 1, 1.5 and 2.0. The ozone gas concentration in the box was adjusted using an ozone gas monitor (Model OZG-EM-01, produced by Applics Corp. The evaluation was performed by a three-stage rating. Specifically, the case where the dye residual ratio was 70% or more at all points was rated A, the case where the dye residual ratio was less than 70% at one or two points was rated B, and the case where the dye residual ratio was less than 70% at all points was rated C.

<Ink Preservation Stability>

Solubility of the dye was evaluated by conducting tests of preservation stability and clogging restorative capacity on the ink. With respect to the ink preservation stability, the ink was put in a container made of polyethylene and a cycle of storage at −15° C. for 24 hours and successive storage at 60° C. for 24 hours (−15° C. (24 hours)→60° C. (24 hours)) was repeated ten times. The presence of deposition of insoluble matter after the preservation was determined and evaluated according to the following criterion.

[Determination Criterion]

The ink after the preservation was put in a test tube and visually observed.

○: state where the insoluble matter was not recognized at all
Δ: state where the insoluble matter was slightly recognized
×: state where the insoluble matter was significantly recognized and it was not in a practical level <Clogging Restorative Capacity>

The ink was filled in the printer and allowed to stand in a surrounding of 40° C. for one month without capping. Thereafter, a number of cleaning operations necessary for all nozzles to perform normal ejection was determined and evaluated according to the following criterion.

[Determination Criterion]

A: return within two times of cleaning
B: return after 3 to 5 times of cleaning
C: return after 6 times of cleaning or more
NG: do not return <Solubility>

The dye was mixed with 5 ml of ethyl acetate and stirred with a magnetic stirrer for 30 minutes. Thereafter, whether the dye was completely dissolved in the solvent or not was confirmed. The evaluation was performed by a three-stage rating according to the definition described below.

○: complete dissolution of 0.5 g of the dye in 5 ml of the solvent
Δ: incomplete dissolution of 0.5 g of the dye in 5 ml of the solvent, but complete dissolution of 0.1 g of the dye in 5 ml of the solvent
×: incomplete dissolution of 0.1 g of the dye in 5 ml of the solvent

TABLE 6

| Sample No. | Dye No. | Structure of Phthalocyanine Substitution Position (α or β) Number of Substituents (n) | Color Tone | Paper Dependency | Water Resistance | Light Fastness | Dark Heat Preservability | Ozone Gas Resistance | Ink Preservation Stability | Solubility | Clogging Restorative Capacity | Oxidation Potential (Eox) |
|---|---|---|---|---|---|---|---|---|---|---|---|---|
| Ink Solution A | 101 | β-position (n = 4) | ○ | A | A | A | A | A | ○ | ○ | A | ○ |
| Ink Solution B | 102 | β-position (n = 4) | ○ | A | A | A | A | A | ○ | ○ | A | ○ |

TABLE 6-continued

| Sample No. | Dye No. | Structure of Phthalocyanine Substitution Position (α or β) Number of Substituents (n) | Color Tone | Paper Dependency | Water Resistance | Light Fastness | Dark Heat Preservability | Ozone Gas Resistance | Ink Preservation Stability | Solubility | Clogging Restorative Capacity | Oxidation Potential (Eox) |
|---|---|---|---|---|---|---|---|---|---|---|---|---|
| Ink Solution C | 103 | β-position (n = 4) | ○ | A | A | A | A | A | ○ | ○ | A | ○ |
| Ink Solution D | 104 | β-position (n = 4) | ○ | A | A | A | A | A | ○ | ○ | A | ○ |
| Ink Solution E | 105 | β-position (n = 4) | ○ | A | A | A | A | A | ○ | ○ | A | ○ |
| Ink Solution 101 | Comparative Compound 1 | β-position (n = 4) | Δ | B | A | B | B | C | x | Δ | C | x |
| Ink Solution 102 | Comparative Compound 2 | β-position (n = 4) | Δ | B | A | B | B | C | x | Δ | C | x |

As is apparent from the results shown in Table 6, the inkjet ink according to the invention is excellent in the color tone, has a small paper dependency, and excellent in the water resistance, light fastness and ozone gas resistance. In particular, it is clear that the ink is excellent in the image preservability, for example, light fastness, ozone gas resistance and the like.

It can also be seen that the ink solution by the preparation method according to the invention does not exhibit degradation of printing due to deposition of component having low solubility even when it has been subjected to severe preservation conditions, and is excellent in ink preservation stability and clogging restorative capacity.

Example 2

Using each of the same inks as prepared in Example 1, an image was printed on inkjet paper (Photo Glossy Paper EX, produced by Fuji Photo Film Co., Ltd.) by the inkjet printer as described in Example 1, and evaluated in the same manner as in Example 1. Thus, the same results as in Example 1 were obtained.

Example 3

Each of the same inks as prepared in Example 1 was fed in a cartridge of inkjet printer (BJ-F850, produced by Canon Inc.), and an image was printed on inkjet paper (Glossy Photo Paper GP-301, produced by Canon Inc.) by the inkjet printer and evaluated in the same manner as in Example 1. Thus, the same results as in Example 1 were obtained.

Example 4

A mixture of 3 parts by weight of each of the phthalocyanine compounds (Compounds 101, 102, 103 and 107) according to the invention and 100 parts by weight of a resin for toner (styrene-acrylate copolymer, trade name: Hymer TB-1000F, produced by Sanyo Chemical Industries, Ltd.) was pulverized in a ball mill and melt-blended by heating at 150° C. After cooling, the resulting solid was coarsely pulverized by a hammer mill and then finely pulverized by an air jet-type pulverizer. The particles were classified to select those having a particle size of 1 to 20 micrometer to prepare a toner. To 10 parts by weight of the toner, 900 parts by weight of carrier iron powder (trade name: FEV250/400, produced by Powdertech Co., Ltd.) was uniformly blended to prepare a developer. Each developer was prepared in the same manner as above except for using 3 parts by weight of dye or 6 parts by weight of pigment as a comparative coloring agent as shown in Table 7 below. Using the developer, duplicate was conducted by a dry type plain paper electrophotographic copying machine (trade name: NP-5000 produced by Canon Inc.).

For the evaluation, by the developer using the color toner containing the compound according to the invention, a reflection image and a transmission image were prepared on paper and OHP sheet according to the above-described image forming method, respectively. The evaluation was conducted in the following manner. A toner adhesion amount was in a range of 0.7±0.05 mg/cm² for the evaluation.

With the image formed, color tone and light fastness were evaluated. Regarding the color tone, the evaluation was visually conducted by a three-stage rating of best, good and poor. The results of evaluation are shown in Table 7 below. In Table 7, symbols ○, Δ and x mean best color tone, good color tone and poor color tone, respectively. The light fastness was evaluated by measuring image density (Ci) just after the recording, irradiating the image with xenon light (85,000 1x) using Weatherometer (Atlas C. 165) for 5 days and then measuring again image density (Cf), and calculated a dye remaining ratio ({Ci−Cf}/Ci×100%). The image density was measured by a reflection densitometer (X-Rite 310TR). The results of evaluation are shown in Table 7 below. In Table 7, symbols ○, Δ and x mean the dye remaining ratio of 90% or more, the dye remaining ratio of less than 90% to 80% and the dye remaining ratio of less than 80%, respectively.

Transparency of the OHP image was evaluated in the following manner. Visible spectral transmittance of the image was measure by Self-Recording Spectrophotometer Model 330, produced by Hitachi, Ltd. using an OHP sheet bearing no toner thereon as a reference and spectral transmittance at 450 nm was obtained, which was used as a measure for the transparency of OHP image. The spectral transmittance of 80% or more, the spectral transmittance less than 80% to 70% and the spectral transmittance less than 70% were indicated by symbols ○, Δ and ×, respectively. The results are shown in Table 7 below.

TABLE 7

|  | Compound No. | Color Tone | Light Fastness | Transparency |
|---|---|---|---|---|
| Invention | 101 | ○ | ○ | ○ |
| Invention | 102 | ○ | ○ | ○ |
| Invention | 103 | ○ | ○ | ○ |
| Invention | 107 | ○ | ○ | ○ |
| Comparative Example 1 | Comparative Dye 3 | Δ | Δ | Δ |
| Comparative Example 2 | Comparative Dye 4 | Δ | Δ | Δ |
| Comparative Example 3 | C.I. Solvent Blue 38 | × | ○ | × |
| Comparative Example 4 | C.I. Solvent Blue 70 | × | ○ | × |

Comparative Dye 3

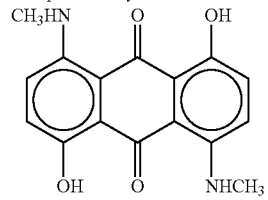

Comparative Dye 4

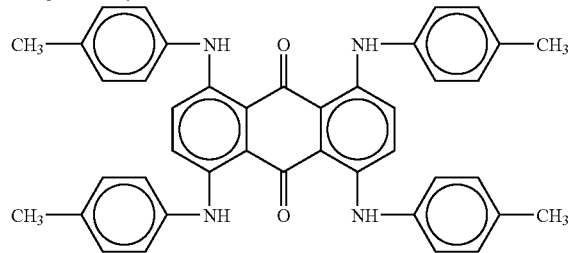

As is apparent from the results shown in Table 7, the phthalocyanine compounds according to the invention are excellent in the light fastness and have clear color tone and high transparency in comparison with the comparative dyes. Since the faithful color reproduction and high OHP quality are obtained by using the color toner according to the invention, the color toner according to the invention is suitable for using as a full color toner. Further, due to the excellent light fastness, an image undergoing preservation for a long period of time can be provided.

Example 5

<Preparation Method of Color Filter>

In this example, a result of application of the phthalocyanine compound to a color filter is described. The color filter was prepared in the following manner. Specifically, a positive resist composition containing a thermosetting resin, a quinonediazide compound, a crosslinking agent, a dye and a solvent was spin-coated on a silicon wafer, and after evaporation of the solvent by heating, exposed through a mask to decompose the quinonediazide compound. After heating, if desired, the resist composition was developed to obtain a mosaic pattern. The exposure was carried out using an i-line exposure stepper (Hitachi LD-5010-i (NA=0.40), produced by Hitachi, Ltd.). As a developer, SOPD or SOPD-B (produced by Sumitomo Chemical Co., Ltd.) was used.

<Preparation of Positive Resist Composition>

A positive resist composition was prepared by mixing 3.4 parts by weight of cresol novolac resin (weight average molecular weight calculated in terms of polystyrene: 4,300) obtained from a mixture of m-cresol/p-cresol/formaldehyde (reaction molar ratio: 5/5/7.5)), 1.8 parts by weight of o-naphthoquinonediazide-5-sulfonic acid ester (two hydroxy groups being esterified on average) prepared by a phenol compound shown below, 0.8 parts by weight of hexamethoxymethylolated melamine, 20 parts by weight of ethyl lactate and one part by weight of the phthalocyanine compound according to the invention shown in Table 8 below.

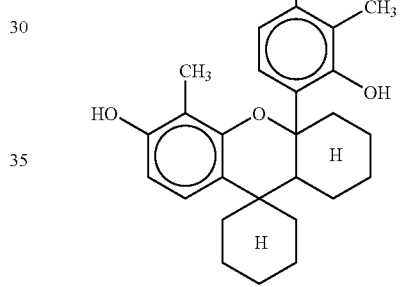

<Preparation of Color Filter>

The positive resist composition was spin-coated on a silicon wafer and the solvent was evaporated. The silicon wafer was exposed, heated at 100° C., and subjected to alkali development to remove the exposed area, whereby a positive color pattern having resolution of 0.8 μm. The pattern was overall exposed and heated at 150° C. for 15 minutes to obtain a cyan complementary color filter.

Comparative Example

In place of the phthalocyanine compound according to the invention used in the above example, one part by weight of Comparative Dye 5 shown below was used to prepare a positive resist composition. The positive resist composition was spin-coated on a silicon wafer and the solvent was evaporated. The silicon wafer was exposed and subjected to alkali development, whereby a positive color pattern having resolution of 1 μm. The pattern was overall exposed and heated at 150° C. for 10 minutes to obtain a cyan color filter.

<Evaluation>

A transmission spectrum of the resulting cyan color filter was measured and sharp-cuts on the short wavelength side and long wavelength side of the spectrum, which are important in color reproduction, were relatively evaluated. Regarding the criterion of absorption characteristic, symbols ○, Δ and × mean good level, barely acceptable level and unacceptable level, respectively. Further, the color filter was irradiated with xenon light (85,000 1x) using Weatherometer (Atlas C. I65) for 7 days, and image densities before and after the xenon irradiation were measured to determine a dye remaining ratio, thereby evaluating the light fastness.

TABLE 8

| | Dye/Pigment No. | Absorption Characteristic | Light Fastness |
|---|---|---|---|
| Invention | 101 | ○ | 98% |
| Invention | 102 | ○ | 95% |
| Comparative Example | Comparative Dye 5 | Δ | 18% |

Comparative Dye 5

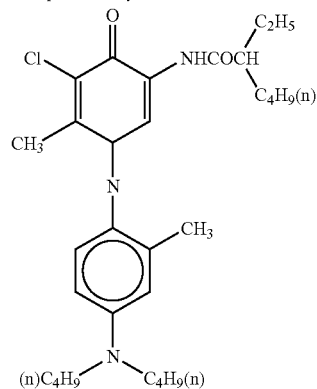

It is apparent that the phthalocyanine dye according to the invention exhibits the sharp-cuts on the short wavelength side and long wavelength side of the spectrum and is excellent in color reproducibility in comparison with the comparative compound. Also, it can be seen that the phthalocyanine dye according to the invention is excellent in the light fastness in comparison with the comparative compound.

Example 6

Test of Example 6 was conducted in the same manner as in Example 1 except that the test method of the ozone gas resistance in Example 1 was changed to an environmental test method as shown below. Specifically, as an, oxidizing gas resistance test method, which is simulated outdoor environment exposed to oxidizing gas, for example, car exhaust emission and sunlight, an oxidation resistance test method using a fluorescent light-irradiating chamber kept at relative humidity of 80% and hydrogen peroxide concentration of 120 ppm described in H. Iwano et al, Journal of Imaging Science and Technology, Vol. 38, pp 140-142 (1994) was used. The results obtained are same as those of the ozone gas resistance in Example 1.

Synthesis methods of the phthalocyanine dye mixture according to the invention will be described in more detail in the following example, but the invention should not be construed as being limited thereto.

The typical phthalocyanine compound according to the invention can be derived, for example, according to the synthesis route shown below. In the following example, λ max and ε max mean the maximum absorption wavelength and a molar extinction coefficient at the maximum absorption wavelength, respectively.

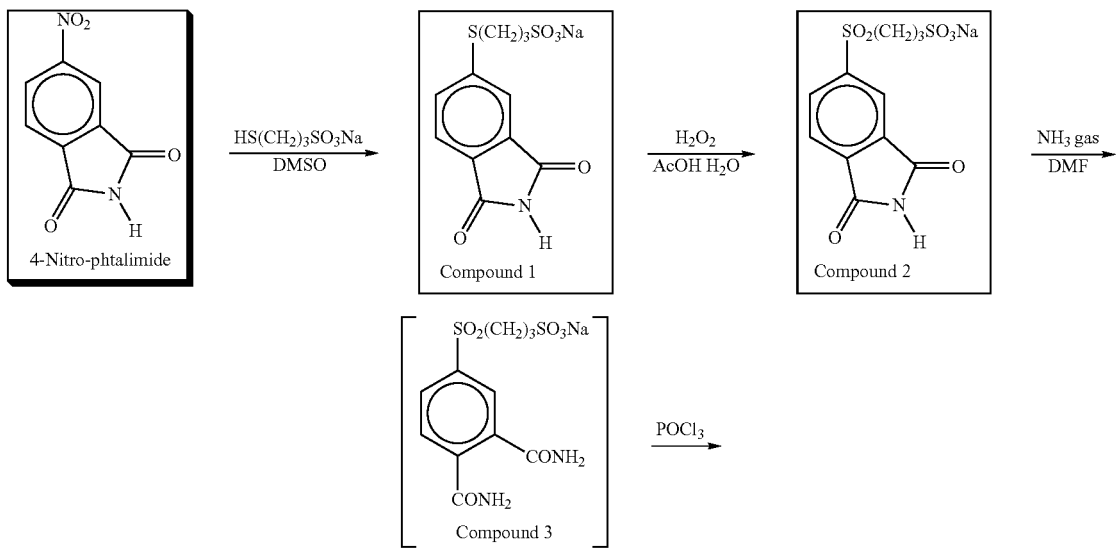

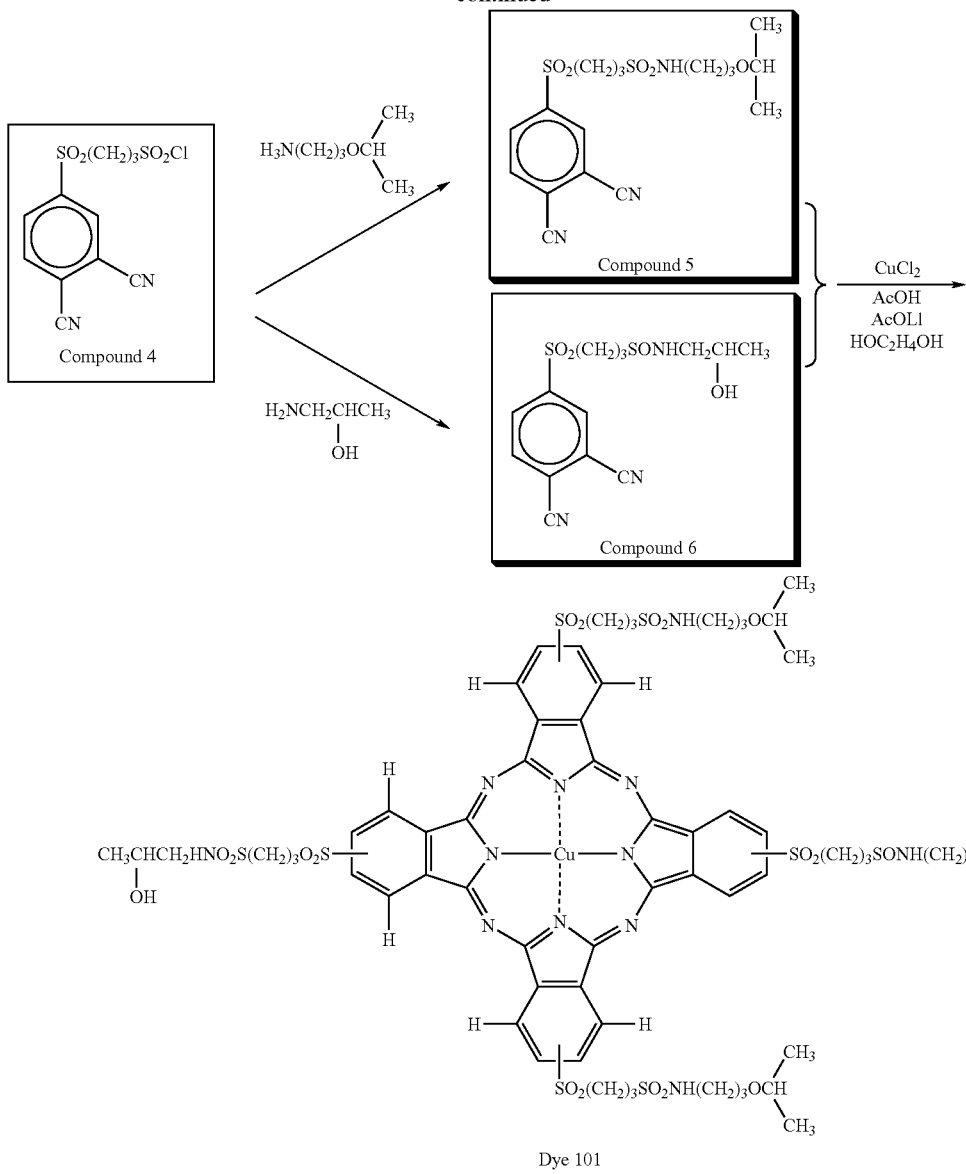

Dye 101

Example 7

Synthesis Example 1: Synthesis of Compound 1

In 1,442 ml of DMSO (dimethylsulfoxide) was dissolved 288.2 g of 4-nitrophthalimide (produced by Tokyo Kaseihin Co., Ltd.) under nitrogen gas stream and to the solution stirred at an inner temperature of 20° C. was added 333 g of sodium 3-mercaptopropanesulfonate (85%). Then, to the solution stirred at the inner temperature of 50° C. was gradually added 173.8 g of anhydrous sodium carbonate. The reaction solution was heated to 70° C. with stirring and further stirred at the same temperature for one hour. After cooling to 40° C., the reaction solution was filtered by a nutsche filter, and the filtrate was poured into 2,885 ml of methanol to crystallize, followed by stirring at room temperature for 30 minutes. To the mixture was added 1,442 ml of isopropanol and cooled to the inner temperature of 10° C. with stirring. The crude crystals deposited were filtered by a nutsche filter, washed with 962 ml of methanol and dried to obtain 503.4 g of crude crystals of Compound 1. $^1$H-NMR (DMSO-d6), δ value TMS standard: 1.89-1.99 (2H, m); 2.51-2.65 (2H, t); 3.24-3.50 (2H, t); 7.64-7.76 (3H, m); 11.29-11.41 (1H, s)

Synthesis Example 2: Synthesis of Compound 2

To a mixture of 48.5 ml of acetic acid and 1,500 ml of water was added 485.0 g of Compound 1, and to the solution stirred at an inner temperature of 25° C. was added 15 g of $Na_2WO_4 \cdot H_2O$ to dissolve by raising the inner temperature to 45° C. Then, 374 ml of hydrogen peroxide solution (30%) was gradually added while taking care of heat generation.

After stirring at the inner temperature of 50° C. for 60 minutes, 400 ml of an aqueous solution containing 88.2 g of sodium sulfite was added to the reaction solution at the inner temperature of 50° C., and then 532 ml of isopropanol was dropwise added at the same temperature. The solution was cooled to 10° C. and further stirred at the same temperature for 30 minutes. The crystals deposited were filtered by a nutsche filter, washed with 525 ml of isopropanol and dried to obtain 462.6 g of Compound 2. $^1$H-NMR (DMSO-d6), δ value TMS standard: 1.25-1.89 (2H, m); 2.48-2.52 (2H, t); 3.59-3.65 (2H, t); 8.04-8.11 (1H, d); 8.20 (1H, s); 8.29-8.33 (1H, d); 11.59-11.90 (1H, s)

Synthesis Example 3: Synthesis of Compound 3

To 900 ml of DMF (dimethylformamide) was added 300 g of Compound 2, and to the solution stirred at an inner temperature of 20° C. was introduced $NH_3$ gas for 90 minutes, followed by further stirring at the same temperature for 3 hours. Then, the reaction solution was stirred at the inner temperature of 20° C. under a reduced pressure (less than 400 mm Hg) to distill off the remaining $NH_3$ gas (reaction solution of Compound 2+$NH_3$→Compound 3).

Synthesis Example 4: Synthesis of Compound 4

To 600 ml of DMF (dimethylformamide) at an inner temperature of 5° C. was dropwise added 315.1 ml of $POCl_3$ while keeping the inner temperature at 15° C. To the solution of $POCl_3$/DMF was dropwise added the reaction solution of Synthesis Example 3 (Compound 2+$NH_3$→Compound 3) while keeping the inner temperature at 10° C. or below, followed by stirring at the inner temperature at 17° C. for one hour. The reaction mixture was then dropwise added to 4,500 ml of water while keeping the inner temperature of 35° C. or below to deposit Compound 4. After stirring the mixture at the inner temperature of 30° C. for 30 minutes, the crude crystals deposited were filtered by a nutsche filter, washed with 4,200 ml of water, then washed with 2,700 ml of isopropanol, and air-dried to obtain 234.6 g of Compound 4. $^1$H-NMR (DMSO-d6), δ value TMS standard: 1.81-1.91 (2H, m); 2.49-2.54 (2H, t); 3.62-3.74 (2H, t); 8.07-8.16 (1H, d); 8.36-8.49 (1H, d); 8.66-8.67 (2H, s)

Synthesis Example 5: Synthesis of Compound 5

To 400 ml of acetonitrile was added 100 g of Compound 4 at an inner temperature of 25° C. to dissolve. To the solution was dropwise added 70.4 g of isopropyloxypropylamine at the inner temperature of 30° C., followed by stirring at the same temperature for one hour. Then, 1,200 ml of warm water (70° C.) was poured into the reaction solution, the inner temperature was raised to 70° C., followed by stirring at the same temperature for one hour. The mixture was gradually cooled to the inner temperature of 25° C. with stirring, and the crystals deposited were filtered by a nutsche filter, washed with 1,000 ml of water and dried to obtain 116.4 g of Compound 5. $^1$H-NMR (DMSO-d6), δ value TMS standard: 1.06-1.08 (6H, d); 1.58-1.63 (2H, t); 1.91-1.94 (2H, m); 2.91-2.93 (2H, dd); 3.07-3.09 (2H, t); 3.33-3.38 (2H, m); 3.47-3.49 (1H, m); 3.63-3.68 (2H, t); 7.12-7.16 (1H, t); 8.36-8.40 (1H, d); 8.43-8.47 (1H, d); 8.68-8.70 (1H, s)

Synthesis Example 6: Synthesis of Compound 6

To 400 ml of acetonitrile was added 100 g of Compound 4 at an inner temperature of 25° C. to dissolve. To the solution was dropwise added 45.1 g of isopropanolamine at the inner temperature of 30° C., followed by stirring at the same temperature for one hour. Then, 1,200 ml of warm water (70° C.) was poured into the reaction solution, the inner temperature was raised to 70° C., followed by stirring at the same temperature for one hour. The mixture was gradually cooled to the inner temperature of 25° C. with stirring, and the crystals deposited were filtered by a nutsche filter, washed with 1,000 ml of water and dried to obtain 91.4 g of Compound 6. $^1$H-NMR (DMSO-d6), δ value TMS standard: 1.01-1.03 (3H, d); 1.91-1.95 (2H, m); 2.79-2.83 (2H, t); 3.10-3.15 (2H, t); 3.62-3.86 (3H, m); 4.62-4.71 (1H, d); 7.12-7.16 (1H, t); 8.08-8.17 (1H, d); 8.37-8.47 (1H, d); 8.68 (1H, s)

Synthesis Example 7: Synthesis of Dye 101

In a mixture of 1.7 ml of acetic acid and 96.7 ml of ethylene glycol were suspended 18.61 g of Compound 5 and 5.57 g of Compound 6 to dissolve by raising an inner temperature to 80° C. To the solution were added 2.02 g of cupric chloride (anhydrous) and 3.96 g of lithium acetate, and the inner temperature was raised to 100° C. After stirring at the same temperature for 5.5 hours, the solution was cooled to the inner temperature of 25° C. and poured into 300 ml of 0.67 N hydrochloric acid to crystallize. After stirring at the same temperature for 30 minutes, the crystals deposited were filtered, washed with 800 ml of water and dried at 70° C. overnight to obtain 22.66 g of crude crystals. The crude crystals were dissolved in THF and purified by silica gel column chromatography with methanol/$CH_2Cl_2$=1/10 (in v/v) to obtain Dye 101. Absorption of the dye in ethyl acetate solution: λ max=597.6 nm; ε max=27,000

According to the present invention, (1) various color compositions, for instance, printing ink, for example, for inkjet recording, an ink sheet for heat-sensitive recording material, a color toner for electrophotography or a color filter used in a display, for example, LCD or PDP or an image sensor, for example, CCD, which have absorption characteristics excellent in color reproducibility and sufficient fastnesses to light, heat, humidity and active gas in environment, are provided by using a phthalocyanine compound having a specific structure as the coloring agent.

(2) The color composition described above is excellent in preservation stability of ink for a long period of time, has high dissolution stability of dissolving components to prevent clogging of nozzle, and is excellent in quick-dry property on an image-receiving material.

(3) Inkjet ink and inkjet recording method, which can provide an image having preferable hue and good fastness to light and active gas in environment, particularly ozone gas, are provided by using the color composition described above.

(4) A method for improving ozone gas discoloration resistance of image recorded is provided by utilizing the above-described inkjet recording method.

The entire disclosure of each and every foreign patent application from which the benefit of foreign priority has been claimed in the present application is incorporated herein by reference, as if fully set forth.

What is claimed is:

1. A dye mixture comprising a plurality of different dyes represented by formula (I):

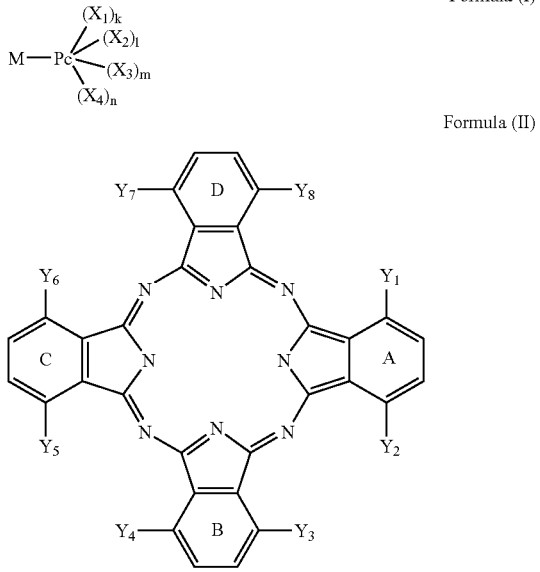

Formula (I)

Formula (II)

wherein M represents a hydrogen atom or a metal atom or an oxide, a hydroxide or a halide thereof;

Pc represents a (k+l+m+n) valent phthalocyanine nucleus represented by formula (II);

$X_1$, $X_2$, $X_3$ and $X_4$ each independently represents a substituent selected from the group consisting of —SO—$R_1$, —$SO_2$—$R_1$, —$SO_2NR_2R_3$, —$CONR_2R_3$, —$CO_2$—$R_1$ and —CO—$R_1$, and at least one of the substituents exists on each of four benzene rings A, B, C and D in formula (II) of the phthalocyanine nucleus, provided that $X_1$, $X_2$, $X_3$ and $X_4$ are not the same simultaneously, that at least one of $X_1$, $X_2$, $X_3$ and $X_4$ is a substituent having two or more carbon atoms, that a total number of carbon atoms included in the substituents represented by $X_1$, $X_2$, $X_3$ and $X_4$ is 8 or more and that the dye does not contain an ionic hydrophilic group in a molecule thereof;

$R_1$ represents a substituted or unsubstituted alkyl group, a substituted or unsubstituted aryl group or a substituted or unsubstituted heterocyclic group;

$R_2$ represents a hydrogen atom, a substituted or unsubstituted alkyl group, a substituted or unsubstituted aryl group or a substituted or unsubstituted heterocyclic group;

$R_3$ represents a substituted or unsubstituted alkyl group, a substituted or unsubstituted aryl group or a substituted or unsubstituted heterocyclic group;

k represents an integer of 0<k<8;
l represents an integer of 0<l<8;
m represents an integer of 0≦m<8;
n represents an integer of 0≦n<8 provided that k, l, m and n satisfy 4≦k+l+m+n≦8; and $Y_1$, $Y_2$, $Y_3$, $Y_4$, $Y_5$, $Y_6$, $Y_7$ and Y8 each independently represents a hydrogen atom or a monovalent substituent, which may have a substituent.

2. The dye mixture according to claim 1, wherein the phthalocyanine nucleus represented by formula (II) is a phthalocyanine nucleus represented by formula (III):

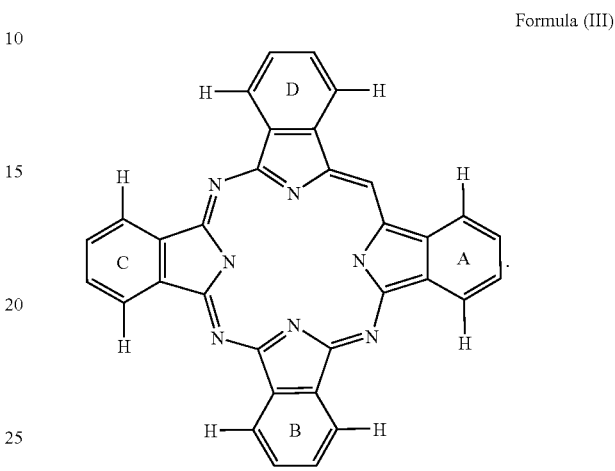

Formula (III)

3. The dye mixture according to claim 1,
wherein $X_1$, $X_2$, $X_3$ and $X_4$ in the dye represented by formula (I) each independently represents a substituent selected from the group consisting of —SO—$R_1$, —$SO_2$—$R_1$ and —$SO_2NR_2R_3$, and at least one of the substituents exists on each of four benzene rings A, B, C and D in formula (II) of the phthalocyanine nucleus.

4. The dye mixture according to claim 2,
wherein the dye represented by formula (I) is a dye represented by formula (IV):

Formula (IV)

wherein M represents a hydrogen atom or a metal atom or an oxide, a hydroxide or a halide thereof;

Pc represents a (k+l) valent phthalocyanine nucleus represented by formula (III);

$X_1$ and $X_2$ each independently represents a substituent selected from the group consisting of —SO—$R_1$, —$SO_2$—$R_1$ and —$SO_2NR_2R_3$, and at least one of the substituents exists on each of four benzene rings A, B, C and D in formula (III) of the phthalocyanine nucleus, provided that $X_1$ and $X_2$ are not the same simultaneously, that at least one of $X_1$ and $X_2$ is a substituent having two or more carbon atoms, that a total number of carbon atoms included in the substituents represented by $X_1$ and $X_2$ is 8 or more and that the dye does not contain an ionic hydrophilic group in a molecule thereof;

$R_1$ represents a substituted or unsubstituted alkyl group, a substituted or unsubstituted aryl group or a substituted or unsubstituted heterocyclic group;

R$_2$ represents a hydrogen atom, a substituted or unsubstituted alkyl group, a substituted or unsubstituted aryl group or a substituted or unsubstituted heterocyclic group;

R$_3$ represents a substituted or unsubstituted alkyl group, a substituted or unsubstituted aryl group or a substituted or unsubstituted heterocyclic group;

k represents an integer of 0<k<8; and l represents an integer of 0<l<8, provided that k and l satisfy $4 \leq k+l \leq 8$.

5. An ink comprising a dye mixture according to claim 1.

6. An inkjet recording ink comprising an ink according to claim 5.

7. An inkjet recording method, which comprises forming an image with an inkjet recording ink according to claim 6 on an image-receiving material comprising a support and an ink-receiving layer containing white inorganic pigment particles.

8. A method for improving ozone gas resistance of a color image material, comprising forming an image with the inkjet recording ink according to claim 6.

* * * * *